United States Patent
Sonoda et al.

(10) Patent No.: US 10,641,927 B2
(45) Date of Patent: May 5, 2020

(54) OPTICAL THIN FILM, OPTICAL ELEMENT, OPTICAL SYSTEM, AND METHOD FOR PRODUCING OPTICAL THIN FILM

(71) Applicant: FUJIFILM Corporation, Tokyo (JP)

(72) Inventors: Shinichiro Sonoda, Kanagawa (JP); Tatsuya Yoshihiro, Kanagawa (JP); Kenichi Umeda, Kanagawa (JP); Yuichiro Itai, Kanagawa (JP); Seigo Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/580,811

(22) Filed: Sep. 24, 2019

(65) Prior Publication Data

US 2020/0033508 A1  Jan. 30, 2020

Related U.S. Application Data

(63) Continuation of application No. PCT/JP2018/003485, filed on Feb. 1, 2018.

(30) Foreign Application Priority Data

Mar. 27, 2017 (JP) .................. 2017-060898
Oct. 2, 2017 (JP) .................. 2017-192681

(51) Int. Cl.
  *G02B 1/116* (2015.01)
  *G02B 1/118* (2015.01)
  (Continued)

(52) U.S. Cl.
  CPC ............ *G02B 1/116* (2013.01); *B32B 15/018* (2013.01); *G02B 1/118* (2013.01); *G02B 15/145* (2019.08); *G02B 15/20* (2013.01)

(58) Field of Classification Search
  CPC ...... G02B 1/116; G02B 15/145; G02B 1/118; G02B 1/115; G02B 1/18; C03C 17/34;
  (Continued)

(56) References Cited

U.S. PATENT DOCUMENTS 5,521,765 A  5/1996  Wolfe
2011/0262694 A1*  10/2011  Janssen ............... C03C 17/3435
  428/119
(Continued)

FOREIGN PATENT DOCUMENTS

JP  8-54507 A  2/1996
JP  2001-324601 A  11/2001
(Continued)

OTHER PUBLICATIONS

Lennart Bergstrom, Hamaker constants of inorganic materials, 1997, Advances in Colloid and Interface Science, 70, 125-169 (Year: 1997).*
(Continued)

*Primary Examiner* — William R Alexander
*Assistant Examiner* — Ephrem Z Mebrahtu
(74) *Attorney, Agent, or Firm* — Birch, Stewart, Kolasch & Birch, LLP.

(57) ABSTRACT

An optical thin film formed by laminating, from the substrate side, an interlayer, a silver-containing metal layer that contains silver, and a dielectric layer, in which an anchor metal diffusion control layer provided between the interlayer and the silver-containing metal layer, an anchor region which includes an oxide of the anchor metal and has a surface energy that is less than the surface energy of the silver-containing metal layer and larger than the surface energy of the anchor metal diffusion control layer is provided between the anchor metal diffusion control layer and the silver-containing metal layer, a cap region which
(Continued)

includes an oxide of the anchor metal is provided between the silver-containing metal layer and the dielectric layer, and the total film thickness of the silver-containing metal layer, the anchor region, and the cap region is 6 nm or less.

7 Claims, 12 Drawing Sheets

(51) Int. Cl.
    *B32B 15/00*     (2006.01)
    *G02B 15/20*     (2006.01)
    *G02B 15/14*     (2006.01)
    *B32B 15/01*     (2006.01)

(58) Field of Classification Search
    CPC ............ C03C 17/3417; C03C 17/3435; C03C 17/3452
    See application file for complete search history.

(56) References Cited

U.S. PATENT DOCUMENTS

| | | | |
|---|---|---|---|
| 2013/0308192 A1 | 11/2013 | Shimoda | |
| 2015/0219799 A1* | 8/2015 | Sonoda | G02B 1/116 359/513 |
| 2017/0151754 A1 | 6/2017 | Yoshihiro et al. | |
| 2018/0095192 A1 | 4/2018 | Sonoda et al. | |

FOREIGN PATENT DOCUMENTS

| | | |
|---|---|---|
| JP | 2003-255105 A | 9/2003 |
| JP | 2006-184849 A | 7/2006 |
| JP | 2013-238709 A | 11/2013 |
| JP | 2014-98885 A | 5/2014 |
| JP | 2015-4919 A | 1/2015 |
| JP | 2015-94878 A | 5/2015 |
| WO | WO 2014/061237 A1 | 4/2014 |
| WO | WO 2016/031133 A1 | 3/2016 |
| WO | WO 2016/189848 A1 | 12/2016 |

OTHER PUBLICATIONS

International Preliminary Report on Patentability (PCT/IPEA/409) issued in International Application No. PCT/JP2018/003485 dated Nov. 13, 2018.

International Search Report (PCT/ISA/210) issued in International Application No. PCT/JP2018/003485 dated May 1, 2018.

Written Opinion of the International Searching Authority (PCT/ISA/237) issued in International Application No. PCT/JP2018/003485 dated May 1, 2018.

Chinese Office Action and Search Report for Chinese Application No. 201880021859.7, dated Jan. 22, 2020, with partial English translation.

\* cited by examiner

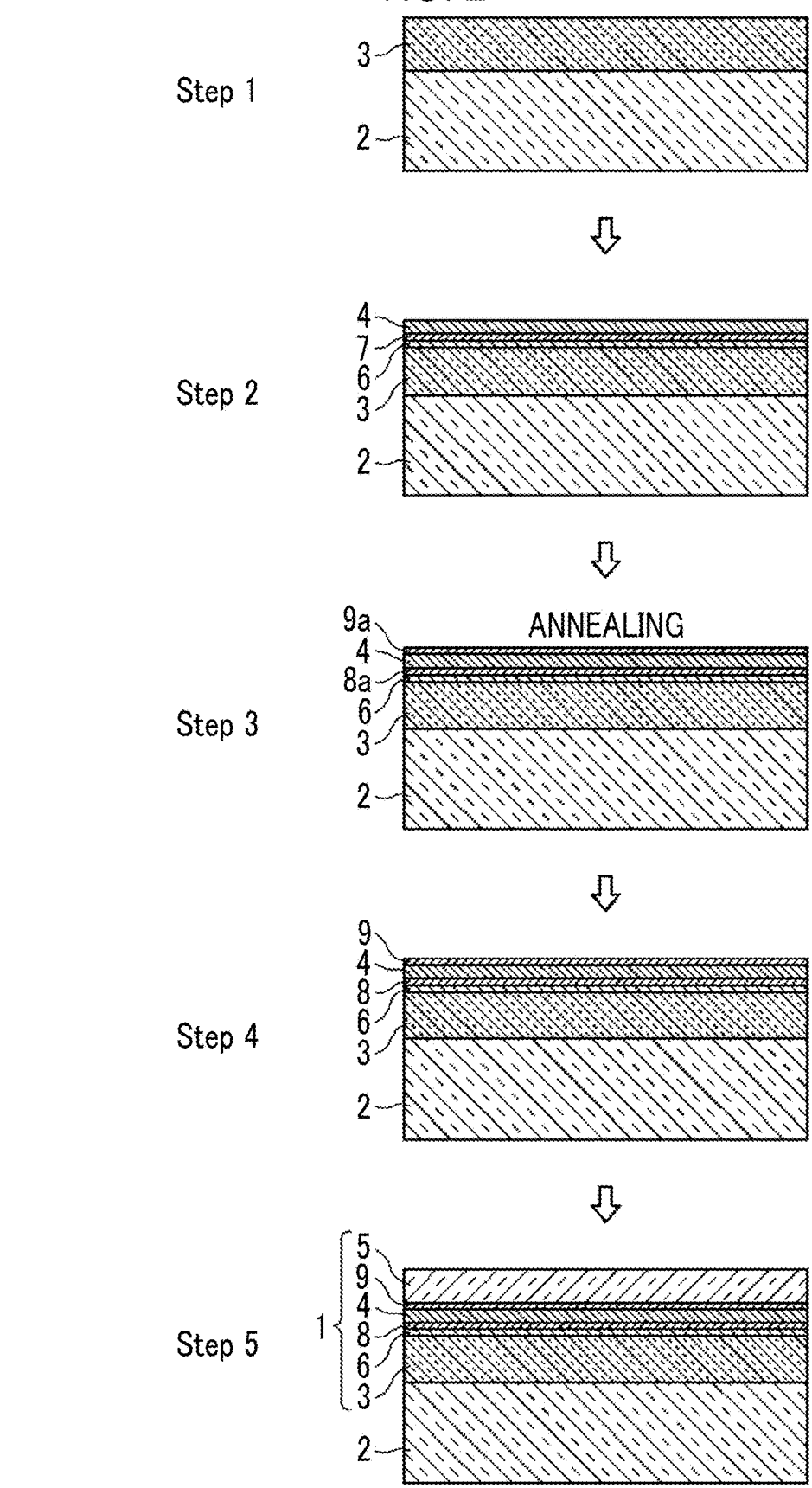

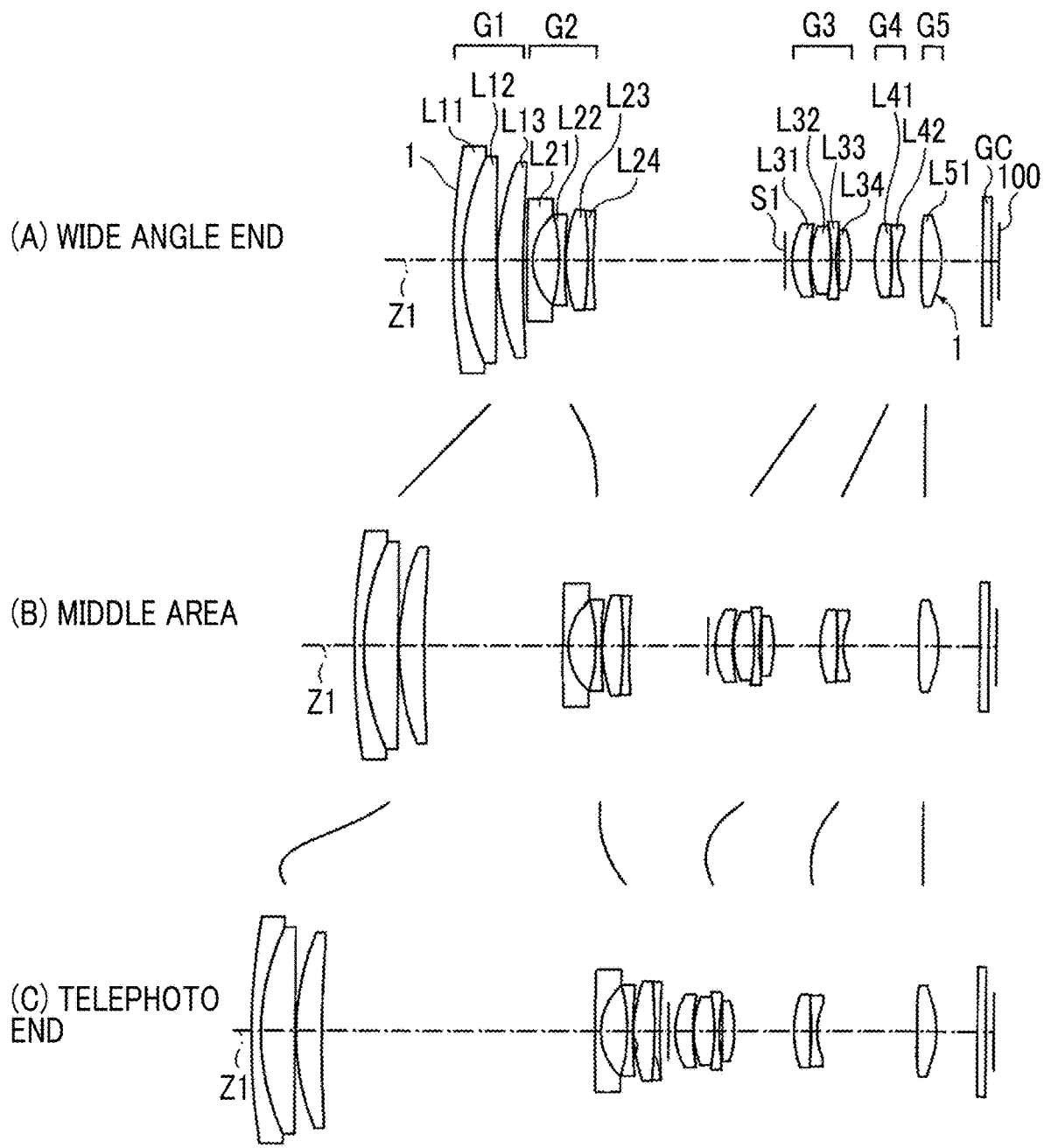

OPTICAL THIN FILM, OPTICAL ELEMENT, OPTICAL SYSTEM, AND METHOD FOR PRODUCING OPTICAL THIN FILM

CROSS-REFERENCE TO RELATED APPLICATIONS

This application is a continuation application of International Application No. PCT/JP2018/003485, filed Feb. 1, 2018, the disclosure of which is incorporated herein by reference in its entirety. Further, this application claims priority from Japanese Patent Application No. 2017-060898, filed Mar. 27, 2017, and the Japanese Patent Application No. 2017-192681, filed Oct. 2, 2017, the disclosures of which are incorporated herein by reference in their entirety.

BACKGROUND OF THE INVENTION

1. Field of the Invention

The present invention relates to an optical thin film such as an antireflection film or a transparent conductive film, an optical element including an optical thin film, an optical system including the optical element, and a method for producing an optical thin film.

2. Description of the Related Art

In the related art, in a lens (transparent substrate) formed of a light transmitting member such as glass or plastic, an antireflection film is provided on a light incident surface in order to reduce the loss of transmitted light caused by surface reflection.

As an antireflection film that exhibits a very low reflectance with respect to visible light, configurations of a fine uneven structure having a pitch shorter than the wavelength of visible light and a porous structure obtained by forming a large number of pores on the uppermost layer thereof are known. In a case of using an antireflection film having a structure layer of a fine uneven structure, a porous structure, or the like on the uppermost layer as a layer of low refractive index, an ultra-low reflectance of 0.2% or less can be obtained in a wide wavelength range of a visible light region. (refer to JP2015-094878A, JP2015-004919A, WO2016-031133A, or the like).

On the other hand, as an antireflection film not including a structure layer on the surface thereof, an antireflection film including a metal layer containing silver (Ag) in a laminate of dielectric films is disclosed in JP2006-184849A, JP1996-054507A (JP-H08-054507A), JP2003-255105A, and the like.

JP2006-184849A discloses an antireflection laminate having a conductive antireflection layer obtained by alternately providing a high refractive index transparent thin film layer and a metal thin film layer on a transparent substrate, and a low refractive index transparent thin film layer in contact with the high refractive index transparent thin film layer on the outermost layer thereof. In addition, JP2006-184849A discloses that as a layer for protection from corrosion, a protective layer may be provided for upper and lower layers of the metal thin film layer. For the protective layer, metals such as zinc, silicon, nickel, chromium, gold, and platinum, alloys thereof, and oxides, fluorides, sulfides and nitrides of these metals may be used.

JP1996-054507A (JP-H08-054507A) discloses an antireflection film including a thin metal layer that is interposed between a front coating layer and a back coating layer and is protected from scratches by a protective silicon nitride layer. For the coating layers, nickel, chromium, rhodium, platinum, tungsten, molybdenum, tantalum, an alloy of nickel and chromium, and the like may be used.

JP2003-255105A discloses an antireflection film that is formed by laminating a metal thin film layer and a metal oxide thin film layer on a substrate, in which an underlayer is provided between the substrate and the metal thin film layer in order to stabilize the metal thin film layer, and an interlayer is provided between the metal thin film layer and the metal oxide thin film layer. As the underlayer and the interlayer, metal thin film layers of silicon, titanium, and the like may be used.

SUMMARY OF THE INVENTION

However, in a case where a metal layer is provided as a protective layer or a coating layer on the upper and lower layers of the metal thin film as disclosed in JP2006-184849A, JP1996-054507A (JP-H08-054507A), or JP2003-255105A, there is a problem that transparency is lowered due to coloration with a metal. Further, in a case where an oxide or a nitride is provided as disclosed in JP2006-184849A, the surface energy is small. Thus, in a case where an extremely thin metal thin film layer having a thickness of, for example, 10 nm or less is formed thereon, aggregation of the metal occurs so that the metal is granulated. Thus, it is difficult to form a flat film. Therefore, it is not possible to achieve both high transparency and high flatness, and antireflection performance may be lowered.

In addition, a metal layer which is made thin and has improved transparency is not limited to utilization as the above-mentioned antireflection film, and application to a transparent conductive film or the like is considered. There is a high need for an optical thin film provided with an ultrathin metal film layer of a thickness of 10 nm or less. In addition, there is a high demand for a technique for forming such a metal thin film layer without granulation.

The present invention is made in consideration of the above circumstances, and an object thereof is to provide an optical thin film including a metal thin layer having a high light transmittance and high flatness, a method for producing the same, an optical element including an optical thin film, and an optical system.

According to the present invention, there is provided an optical thin film that is formed by laminating, from a substrate side, an interlayer, a silver-containing metal layer containing silver, and a dielectric layer in this order, in which an anchor metal diffusion control layer that has a Hamaker constant of $7.3 \times 10^{-20}$ J or more is provided between the interlayer and the silver-containing metal layer, an anchor region which includes an oxide of an anchor metal and has a surface energy that is less than a surface energy of the silver-containing metal layer and larger than a surface energy of the anchor metal diffusion control layer is provided between the anchor metal diffusion control layer and the silver-containing metal layer, a cap region which includes an oxide of the anchor metal is provided between the silver-containing metal layer and the dielectric layer, and a total film thickness of the silver-containing metal layer, the anchor region, and the cap region is 6 nm or less.

Here, the expression "containing silver" means that the content of silver included in the silver-containing metal layer is 50 atomic % or more.

In addition, the term "anchor metal" used here refers to a metal of which, in a case where a layer is formed of the metal, the surface energy has a smaller difference with the surface energy of the silver-containing metal layer than with the surface energy of the anchor metal diffusion control layer.

In the optical thin film according to the present invention, it is preferable that the anchor metal diffusion control layer includes a metal oxide, a metal nitride, a metal oxynitride or a metal carbide.

In the optical thin film according to the present invention, it is preferable that the anchor metal diffusion control layer contains a Hf oxide.

Here, the expression "contains a Hf oxide" means that the content of Hf oxide in the anchor metal diffusion control layer is 20% by mole or more. It is more preferable that the occupancy ratio of Hf oxide in the anchor metal diffusion control layer is 50% by mole or more, and it is particularly preferable that the anchor metal diffusion control layer is constituted of only a Hf oxide (the occupancy ratio is 100%). The Hf oxide may include an oxygen defect, and in a case where the Hf oxide is expressed as $HfO_{2-x}$, X is preferably in a range of 0 to 1.5. In the following description, the Hf oxide is expressed as $HfO_2$ including a case where the Hf oxide includes an oxygen defect.

In the optical thin film according to the present invention, it is preferable that the anchor region includes a non-oxidized anchor metal, and a content of the oxide ratio of the anchor metal is larger than a content ratio of the non-oxidized anchor metal.

In the optical thin film according to the present invention, it is preferable that the anchor metal is Ge, Sn, In, Ga, or Zn.

It is preferable that the optical thin film according to the present invention further comprises a fine uneven layer having alumina hydrate as a main component on a surface of the dielectric layer, and the total film thickness of the silver-containing metal layer, the anchor region, and the cap region is 2.7 nm or less.

According to the present invention, there is provided an optical element comprising: an antireflection film formed of the optical thin film according to the present invention.

According to the present invention, there is provided an optical system comprising: a group lens in which a surface on which the antireflection film of the optical element according to the present invention is provided is arranged as an outermost surface.

Here, the expression "outermost surface" refers to one surface of a lens arranged at the ends of the group lens consisting of a plurality of lenses and refers to a surface which becomes the end surface of the group lens.

According to the present invention, there is provided a method for producing an optical thin film formed by laminating an interlayer, a silver-containing metal layer containing silver and having a thickness of 6 nm or less, and a dielectric layer on a substrate in this order, the method comprising:

forming an anchor metal diffusion control layer having a Hamaker constant of $7.3 \times 10^{-20}$ J or more on the interlayer;

forming an anchor metal layer formed of an anchor metal having a surface energy which is less than a surface energy of the silver-containing metal layer and is larger than a surface energy of the anchor metal diffusion control layer on the anchor metal diffusion control layer;

forming the silver-containing metal layer;

subjecting a laminate formed by laminating the interlayer, the anchor metal diffusion control layer, the anchor metal layer, and the silver-containing metal layer on the substrate to annealing treatment under an oxygen-containing atmosphere; and forming the dielectric layer on an outermost surface of the laminate.

The optical thin film according to the present invention is formed by laminating, from a substrate side, an interlayer, a silver-containing metal layer containing silver, and a dielectric layer in this order, in which an anchor metal diffusion control layer that has a Hamaker constant of $7.3 \times 10^{-20}$ J or more is provided between the interlayer and the silver-containing metal layer, an anchor region which includes an oxide of the anchor metal and has a surface energy that is less than the surface energy of the silver-containing metal layer and larger than the surface energy of the anchor metal diffusion control layer is provided between the anchor metal diffusion control layer and the silver-containing metal layer, a cap region which includes an oxide of the anchor metal is provided between the silver-containing metal layer and the dielectric layer, and the total film thickness of the silver-containing metal layer, the anchor region, and the cap region is 6 nm or less. According to the configuration, the silver-containing metal layer in the optical thin film according to the present invention has a high light transmittance and high flatness.

BRIEF DESCRIPTION OF THE DRAWINGS

FIG. 2 is a diagram showing a production step of the optical thin film.

FIG. 3 is a diagram showing a configuration of an optical system consisting of a group lens including the optical element of the present invention.

DESCRIPTION OF THE PREFERRED EMBODIMENTS

Hereinafter, embodiments of the present invention will be described.

Figure 1A:
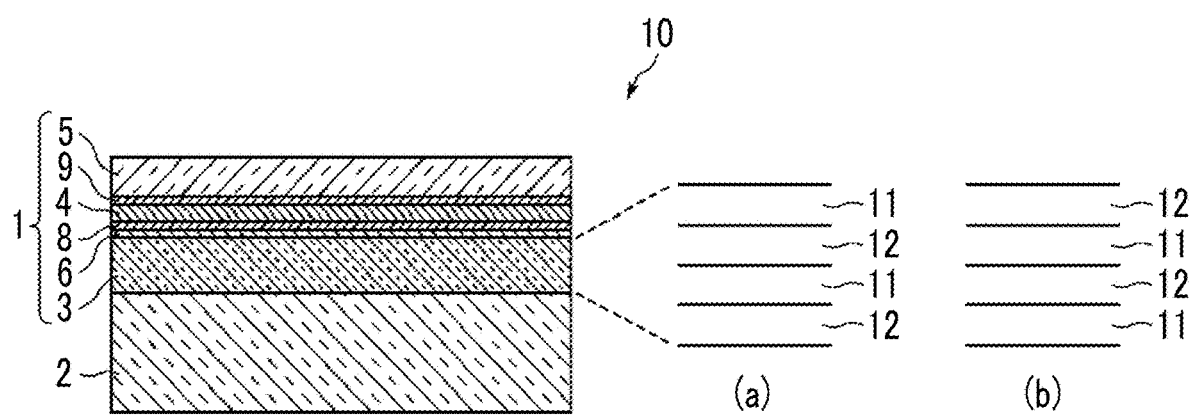
FIG. 1A is a schematic cross-sectional view showing a schematic configuration of an optical element including an optical thin film according to a first embodiment of the present invention.

FIG. 1A is a schematic cross-sectional view showing the schematic configuration of an optical element 10 including an optical thin film 1 according to a first embodiment of the present invention. As shown in FIG. 1A, the optical thin film 1 of the embodiment is formed by laminating an interlayer 3, a silver-containing metal layer 4 containing silver (Ag), and a dielectric layer 5 on a substrate 2 in this order. In the optical thin film 1, an anchor metal diffusion control layer 6 having a Hamaker constant of $7.3 \times 10^{-20}$ J or more is provided between the interlayer 3 and the silver-containing metal layer 4. Further, in the optical thin film 1, an anchor region 8 including an oxide of an anchor metal is provided between the anchor metal diffusion control layer 6 and the silver-containing metal layer 4, and a cap region 9 including an oxide of the anchor metal is provided between the silver-containing metal layer 4 and the dielectric layer 5.

Here, the anchor metal is a metal used for an underlayer (anchor metal layer) for forming a flat silver-containing metal layer 4. The anchor metal layer has a surface energy with a smaller difference with the surface energy of the silver-containing metal layer than with the surface energy of the anchor metal diffusion control layer.

The shape of the substrate 2 is not particularly limited and the substrate is a transparent optical member (transparent substrate) that is mainly used in an optical device such as a flat plate, a concave lens, or a convex lens and also may be a substrate constituted by a combination of a curved surface having a positive or negative curvature and a flat surface. In addition, a flexible film may be used as the substrate 2. As the material for the substrate 2, glass, plastic, and the like can be used. Here, the term "transparent" means that the internal transmittance is 10% or more with respect to light in a wavelength range of 400 nm to 800 nm (visible light).

The refractive index of the substrate 2 is not particularly limited and is preferably 1.45 or more. The refractive index of the substrate 2 may be 1.61 or more and 1.74 or more and further 1.84 or more. For example, the substrate 2 may be a high power lens such as a first lens of a group lens of a camera or the like. In the present specification, unless otherwise specified, the refractive index indicates a refractive index with respect to light having a wavelength of 550 nm.

The interlayer 3 may be a single layer or may be formed of a plurality of layers. The interlayer 3 is appropriately provided depending on the application and is basically constituted of a material transparent to visible light.

In a case where the optical thin film 1 is an antireflection film, the interlayer 3 may be constituted of a angle layer having a refractive index different from that of the substrate 2 and may be constituted of a plurality of layers in which a layer of high refractive index 11 and a layer of low refractive index 12 are alternately laminated as shown in (a) and (b) of FIG. 1A. In this case, as shown in (a) of FIG. 1A, the layer 12 of low refractive index and the layer 11 of high refractive index may be laminated in this order from the substrate 2. As shown in (b) of FIG. 1A, the layer 11 of high refractive index and the layer 12 of low refractive index may be laminated in this order from the substrate 2. In addition, the number of layers of the interlayer 3 is not limited, but is preferably set to 16 layers or less from the viewpoint of suppressing costs.

The refractive index of the layer 11 of high refractive index may be higher than the refractive index of the layer 12 of low refractive index, and the refractive index of the layer 12 of low refractive index may be lower than the refractive index of the layer 11 of high refractive index. It is more preferable that the refractive index of the layer 11 of high refractive index is higher than the refractive index of the substrate 2 and the refractive index of the layer 12 of low refractive index is lower than the refractive index of the substrate 2.

The layers 11 of high refractive index, or the layers 12 of low refractive index may not have the same refractive index. However, it is preferable that the layers are formed of the same material and have the same refractive index from the viewpoint of suppressing material costs, film formation costs, and the like.

Examples of the material for forming the layer 12 of low refractive index include silicon oxide ($SiO_2$), silicon oxynitride (SiON), gallium oxide ($Ga_2O_3$), aluminum oxide ($Al_2O_3$), lanthanum oxide ($La_2O_3$), lanthanum fluoride ($LaF_3$), magnesium fluoride ($MgF_2$), and sodium aluminum fluoride ($Na_3AlF_6$).

Examples of the material for forming the layer 11 of high refractive index include niobium pentoxide ($Nb_2O_5$), titanium oxide ($TiO_2$), zirconium oxide ($ZrO_2$), tantalum pentoxide ($Ta_2O_5$), silicon oxynitride (SiON), silicon nitride ($Si_3N_4$), and silicon niobium oxide (SiNbO).

The refractive index can be changed to some extent by controlling any of these compounds to have the constitutional element ratio which is shifted from the compositional ratio of the stoichiometric ratio or by forming a film by controlling the film formation density. The materials constituting the layer of low refractive index and the layer of high refractive index are not limited to the above compounds as long as the above refractive index conditions are satisfied. Further, unavoidable impurities may be included.

Each layer of the interlayer 3 is preferably formed by using a vapor phase film formation method such as vacuum deposition, plasma sputtering, electron cyclotron sputtering, or ion plating. According to the vapor phase film formation method, a laminated structure having various refractive indexes and layer thicknesses can be easily formed.

The silver-containing metal layer 4 is a layer formed of 50 atomic % or more of silver with respect to the constitutional elements. The silver-containing metal layer 4 may contain at least one of palladium (Pd), copper (Cu), gold (Au), neodymium (Nd), samarium (Sm), bismuth (Bi), platinum (Pt), tin (Sn), aluminum (Al), zinc (Zn), magnesium (Mg), indium (In), gallium (Ga), or lead (Pb), in addition to silver.

Specifically, for example, as the material forming the silver-containing metal layer 4, an Ag—Nd—Cu alloy, an Ag—Pd—Cu alloy, an Ag—Bi—Nd alloy, or the like may be suitably used. Since the silver-containing metal layer 4 is formed as a very thin layer whose design film thickness is preferably 6 nm or less, atom migration occurs between the layers arranged above and below and the composition at formation and the actual composition are different.

As the raw material for forming the silver-containing metal layer 4, a material in which 85 atomic % or more of the constitutional elements is silver is preferably used. In this case, the content of metal elements other than silver may be less than 15 atomic %, but is more preferably 5 atomic % or less and even more preferably 2 atomic % or less. In this case, the content refers to a total content of two or more metal elements in a case in which the metal layer contains two or more metal elements other than silver. From the viewpoint of preventing reflection, it is most preferable to use pure silver. On the other hand, from the viewpoint of flatness and durability of the silver-containing metal layer, the silver-containing metal layer preferably contains metal elements other than silver.

In the optical thin film 1, the total film thickness of the anchor region 8, the silver-containing metal layer 4, and the cap region 9 is 6 nm or less. The total film thickness may be appropriately set in a range of 6 nm or less according to the application. The total film thickness is preferably 0.5 nm or more and more preferably 1 nm or more. The film thickness used here means the total film thickness including the anchor region 8, the silver-containing metal layer 4, and the cap region 9 in the optical thin film after production and is a value obtained by X-ray reflectance measurement. Specifically, for example, the film thickness can be obtained by measuring a signal near the critical angle using RIGAKU RINT ULTIMA III (CuK α-line at 40 kV and 40 mA), and extracting and fitting the obtained vibration component.

The total film thickness of the silver-containing metal layer 4 and the anchor metal layer described later is, as a design film thickness, 6 nm or less, preferably 5 nm or less, and particularly preferably 4 nm or less. Since the anchor metal is diffused into the silver-containing metal layer and the interface region thereof in the production process, the layers are optically integrally handled and the film thickness is also measured as the total film thickness of the anchor region, the silver-containing metal layer, and the cap region as described above.

A vapor phase film formation method such as vacuum deposition, plasma sputtering, electron cyclotron sputtering, or ion plating is preferably used in the formation of the silver-containing metal layer 4.

The material for constituting the dielectric layer 5 is not particularly limited. In a case where the optical thin film 1 is an antireflection film, the refractive index of the dielectric layer 5 is preferably 1.35 or more and 1.51 or less. In this case, examples of the material for constituting the dielectric layer 5 include silicon oxide ($SiO_2$), silicon oxynitride (SiON), magnesium fluoride ($MgF_2$), and sodium aluminum fluoride ($Na_3AlF_6$). Particularly preferable is $SiO_2$ or $MgF_2$. The refractive index can be changed to some extent by controlling any of these compounds to have the constitutional element ratio which is shifted from the compositional ratio of the stoichiometric ratio or by forming a film by controlling the film formation density.

The film thickness of the dielectric layer 5 is preferably about λ/4n in a case in which a target wavelength is λ and the refractive index of the dielectric layer is n. Specifically, the thickness of the dielectric layer is about 70 nm to 100 nm.

The anchor region 8 is a region formed by alternation of an anchor metal layer 7 which is provided to smoothly form the silver-containing metal layer before the silver-containing metal layer 4 is laminated, is formed of an anchor metal, and has a thickness of 0.2 nm to 2 nm (refer to the production method described later) in the production process. That is, the anchor region is formed at an interface region between the anchor metal diffusion control layer and the silver-containing metal layer 4. Here, the alternation means that mixing with the constitutional elements of the interlayer and the silver-containing metal layer or oxidation of a metal element or the like occurs and the state of the anchor metal layer becomes different from the state at the time of formation of the anchor metal layer.

Similarly, the cap region 9 is a region formed by making the anchor metal constituting the anchor metal layer 7 to pass through the silver-containing metal layer 4 and moving the anchor metal to the surface of the silver-containing metal layer 4 in the production process. This cap region 9 includes an oxide of the anchor metal obtained and is oxidized by oxygen under an environment and is formed at an interface region between the silver-containing metal layer 4 and the dielectric layer 5.

After the anchor metal layer 7 is altered to the anchor region 8 and the cap region 9, there is a case where the total film thickness of both regions 8 and 9 is increased with the oxidation of the anchor metal by about two times compared to the film thickness of the anchor metal layer 7.

In optical design, the anchor metal layer is incorporated into the film thickness as part of the silver-containing metal layer.

Accordingly, the atoms present in the silver-containing metal layer 4 and the anchor metal diffusion control layer 6 are mixed in the anchor region 8 in addition to the anchor metal and the oxide thereof, and the atoms present in the silver-containing metal layer 4 and the dielectric layer 5 are mixed in the cap region 9 in addition to the anchor metal oxide. The anchor region 8 and the cap region 9 are regions in which when the content of the anchor metal is measured in the depth direction (lamination direction), the content is about 1 nm or less around a position showing the peak (the position in the depth direction) in line profiles showing changes in the content at the position in the depth direction (refer to FIG. 9). In the line profiles of the anchor metals, two peaks are observed. Of the two peaks, one closer to the substrate is the peak of the anchor region and the other far from the substrate is the peak of the cap region.

As described above, the anchor metal layer formed of the anchor metal has a surface energy with a smaller difference with the surface energy of the silver-containing metal layer than with the surface energy of the anchor metal diffusion control layer. In the present specification, the surface energy is defined as a surface energy (surface tension) γ calculated using $\gamma=\gamma_0+(t-t_0)(d\gamma/dt)$ from Metal Data Book, edited by The Japan Institute of Metals, version No. 4, p. 16.

Hereinafter, the surface energies of various metal elements at room temperature calculated by the above method are exemplified.

TABLE 1

| Element | Surface energy γ (mN/m) | Element | Surface energy γ (mN/m) | Element | Surface energy γ (mN/m) |
|---|---|---|---|---|---|
| Bi | 395.22 | Si | 1045.05 | Ti | 2081.6 |
| Pb | 507.26 | Ag | 1052.712 | Cr | 2292 |
| Sn | 558.49 | Al | 1136.25 | Ir | 2317.983 |
| In | 567.844 | Mn | 1333.2 | Ni | 2321.02 |
| Mg | 778.1 | Cu | 1422.54 | Co | 2592.32 |
| Nd | 778.91 | Au | 1679.76 | Fe | 2612.39 |
| Zn | 848.98 | Pd | 1835.94 | Ta | 2888 |
| Ge | 857.34 | Hf | 2032.78 | Mo | 3024.6 |
|  |  | Ga | 718 | W | 3472.08 |

In a case where the silver-containing metal layer is a silver film, according to the above table, the surface energy is 1053 mN/m. In contrast, specifically, the anchor metal diffusion control layer includes a metal oxide, a metal nitride, a metal oxynitride or a metal carbide, and these generally have surface energy less than the surface energy of metal. For example, the surface energies of $TiO_2$, $HfO_2$, and $Ta_2O_5$ are respectively about 350 mN/m, 330 mN/m, and 280 mN/m, and a difference with the surface energy of the silver film is more than 700 mN/m.

In a case where an ultrathin film of silver (6 nm or less) is directly formed on a film, such as an oxide or nitride film, having a large difference with the surface energy of the silver film, a case where silver particles are bonded to each other is more stable than a case where the silver is bonded with the oxide or nitride. Thus, grain growth of the silver is promoted. Therefore, it is difficult to form a smooth ultrathin film. During the investigation conducted by the present inventors, the inventors have found that in order to obtain a smooth ultrathin film, it is effective to provide an anchor metal layer having a surface energy close to the surface energy of the silver film on the deposition surface of the silver film. By providing the anchor metal layer, the growth of crystal grains is suppressed in the silver-containing metal layer and thus a flat ultrathin film can be obtained.

As the anchor metal, among the metal elements exemplified in Table 1, an anchor metal can be appropriately selected from bismuth (Bi), lead (Pb), tin (Sn), indium (In), magnesium (Mg), zinc (Zn), gallium (Ga), germanium (Ge), silicon (Si), aluminum (Al), manganese (Mn), copper (Cu) and gold (Au), and used according to the constituent material of the anchor metal diffusion control layer, whose surface energy satisfies a range of about more than 350 mN/m and 1750 mN/m or less.

The surface energy of the anchor metal is preferably more than 350 mN/m and 1700 mN/m or less, and more preferably 500 mN/m or more. Accordingly, Pb, Sn, In, Mg, Zn, Ga, Si, Cu, Au, and Ge are preferable. According to the investigation of the present inventors, from the viewpoint of suppressing an increase in particle size of Ag, In, Ga, and Ge are preferable, and Ge is particularly preferable. The anchor metal may not be a single metal but may include two or more metals.

When the anchor metal layer is formed, an alloy layer formed of two or more metals may be formed and when the anchor metal layer is formed, a plurality of layers formed of a single metal may be laminated. In a case where a plurality of layers are laminated, it is preferable that the layers are laminated such that a layer having a surface energy closer to the surface energy of the silver-containing metal layer is laminated on the side closer to the silver-containing metal layer.

On the other hand, there is a concern of lowering of transparency due to the metal constituting such an anchor metal layer, but it is found that transparency is improved by effectively oxidizing the anchor metal to form a metal oxide.

Although it is described in JP2006-184849A that as the protective layer for protecting the metal thin film from corrosion, a metal oxide may be provided for the upper and lower layers of the metal thin film, in a case where the underlayer when the silver-containing metal layer is formed is an oxide layer, as already described above, a uniform ultrathin metal film cannot be formed. On the other hand, in a method of producing the optical thin film according to the embodiment of the present invention, the anchor metal layer formed of the anchor metal is not oxidized and the silver-containing metal layer is formed on the anchor metal layer. Thus, it is possible to sufficiently secure flatness. Since the anchor metal layer is oxidized after sufficient flatness and adhesiveness are secured, an ultrathin metal film achieving both high flatness and high transparency can be formed.

There is a case where an oxidized anchor metal (anchor metal oxide) and an unoxidized anchor metal are mixed in the anchor region. However, it is desirable that the content ratio of the anchor metal oxide is larger than the content ratio of the unoxidized anchor metal, and it is particularly preferable that the anchor metal included in the anchor region is fully oxidized. The magnitude relationship between the content ratio of the oxide of the anchor metal and the content ratio of the unoxidized anchor metal in the anchor region can be confirmed based on the signal intensity ratio in measurement by X-ray photoelectron spectroscopy (XPS).

The cap region is considered to have an effect of preventing silver from aggregating and growing into a granular form at the time of application of annealing treatment. In the production process, in a stage in which the anchor metal layer and the silver-containing metal layer are sequentially formed, the anchor metal starts to move to the cap region and in this state, oxidation of the anchor metal moved to the surface occurs by exposure to the atmospheric air.

It is considered that the anchor metal becomes stable by becoming an oxide, and cap performance such as silver migration suppression, aggregation suppression, long-term stability, water resistance and moisture resistance is improved. The most part of the anchor metal of the cap region is oxidized by performing annealing in the presence of oxygen. In this case, it is preferable that 80% or more of the anchor metal included in the cap region is oxidized and it is more preferable that all of the anchor metal in the cap region is oxidized to form an anchor metal oxide. For example, in a case where the anchor metal is Ge, it is preferable to satisfy Ge/O≤1/1.8 and it is particularly preferable to satisfy Ge/O=1/2.

The anchor metal diffusion control layer 6 is a layer provided to suppress the diffusion of the anchor metal. As already described above, an ultrathin film of 10 nm or less can be formed by incorporating the anchor metal layer in the formation of the ultrathin metal layer. However, the present inventors have found that in a case of achieving further ultra-thin film formation in the silver-containing metal layer 4 having a film thickness of 6 nm or less, the diffusion of the anchor metal constituting the anchor metal layer has to be suppressed. By forming the silver-containing metal layer 4 in a state in which the anchor metal layer is not oxidized, the flatness of the silver-containing metal layer is secured. Thereafter, by performing annealing treatment under an oxygen-containing atmosphere, the anchor metal is diffused, passes through the silver-containing metal layer, and is moved to the cap region on the silver-containing metal layer. At this time, in a case where the whole anchor metal is moved to the cap region, it has been found that the stability of the silver-containing metal layer 4 as a film is lowered, the flatness is not retained, and partial aggregation occurs in some cases.

In the present invention, in order to suppress the diffusion of the anchor metal, as the underlayer of the anchor metal layer, the anchor metal diffusion control layer 6 is provided. For the anchor metal diffusion control layer 6, the ability to attract the anchor metal is important. The present inventors have focused on and investigated the Hamaker constant which is an index of van der Waals force known as a force to attract substances to each other, it has been found that by providing the anchor metal diffusion control layer 6 having a Hamaker constant of $7.3 \times 10^{-20}$ J or more, it is possible to form an ultrathin silver-containing thin film layer in the order of several nm in which the diffusion of the anchor metal is suppressed and high uniformity is attained.

The Hamaker constant can be obtained as follows based on the van Oss theory. The surface energy $\gamma$ is divided into three components of a Lifshitz vdW (van der Waals) term ($\gamma^{LW}$), a donor term ($\gamma^-$), and an acceptor term ($\gamma^+$) and calculated as $\gamma=\gamma^{LW}+2(\gamma^+\gamma^-)^{1/2}$. The contact angles of three liquids of water, diiodomethane, and ethylene glycol are measured and the Lifshitz vdW term ($\gamma^{LW}$) in the surface energy of the thin film is calculated. Then, the Hamaker constant $A_{11}$ is calculated from $A_{11}=24\pi D_0^2\gamma^{LW}$. Intermolecular and Surface Forces (3rd edition), J. N. Israelachvili, Asakura Shoten, (translated by Hiroyuki Oshima) is referred to and $D_0=0.165$ nm is adopted (from the rule of thumb).

As already described above, a certain degree of anchor metal diffusion is preferable for forming the cap region and the Hamaker constant is preferably $30.0\times10^{20}$ j or less.

The material for the anchor metal diffusion control layer 6 is not particularly limited as long as the Hamaker constant is $7.3\times10^{-20}$ J or more. However, the material is preferably transparent to visible light and preferably contains a metal oxide, a metal nitride, a metal oxynitride or a metal carbide to obtain sufficient transparency. Specific examples of constitutional materials include an oxide, nitride, oxynitride, or carbide of Si, Nb, Hf, Zr, Ta, Mg, Al, La, Y, or Ti, and a mixture thereof. Generally, since a nitride of a metal has a larger Hamaker constant than an oxide of the same metal, the effect of suppressing the diffusion of the anchor metal is high. On the other hand, an oxide of a metal is more transparent than a nitride thereof. More specifically, examples thereof include MgO ($A_{11}=7.3\times10^{-20}$ J), $Ta_2O_5$ ($A_{11}=9.5\times10^{-20}$ J), $Al_2O_3$ ($A_{11}=9.6\times10^{-20}$ J), $TiO_2$ ($A_{11}=10\times10^{-20}$ J), $HfO_2$ ($A_{11}=11.2\times10^{-20}$ J), $ZrO_2$ ($A_{11}=11.8\times10^{-20}$ J), $Si_3N_4$ ($A_{11}=9.5\times10^{-20}$ J), and $Nb_2O_5$ ($A_{11}=12\times10^{-20}$ J). The numbers in the parenthesis indicate the Hamaker constant $A_{11}$. Among these, it is preferable to contain a Hf oxide ($HfO_2$). It is more preferable that the occupancy ratio of Hf oxide in the anchor metal diffusion control layer is 50% by mole or more and it is particularly preferable that the anchor metal diffusion control layer is constituted of only $HfO_2$ (the occupancy ratio is 100% by mole). The present inventors have confirmed that in a case of using $HfO_2$, the uniformity of the silver-containing metal layer is particularly high (refer to Examples below).

The film thickness of the anchor metal diffusion control layer 6 is preferably 5 nm or more and 100 nm or less to improve the adhesiveness with the silver-containing metal layer 4.

The anchor metal diffusion control layer 6 is formed of a material different from the material constituting the interlayer 3.

The layer of the interlayer 3 to be laminated on the side closest to the silver-containing metal layer can also function as the anchor metal diffusion control layer as long as the Hamaker constant is $7.3\times10^{-20}$ J or more. In this case, as long as the condition as the anchor metal diffusion control layer is satisfied, the layer of low refractive index or the layer of high refractive index in the interlayer 3 may be used.

By providing the anchor region and the cap region as described above and providing the anchor metal diffusion control layer, an ultrathin silver film structure achieving both high flatness and high transparency can be realized. The optical thin film according to the embodiment of the present invention may include other layers such as a protective layer having a function of protection for suppressing oxidation of the silver-containing metal layer, in addition to the above-described respective layers. In addition, in the film formation of each layer constituting the optical thin film according to the embodiment of the present invention, regarding layers other than the silver-containing metal layer, in a case where an ultrathin layer of nm order is formed, it is difficult to form a uniform film, and in reality, an uneven film is formed or parts (sea) not partially formed into a sea-island state are formed. However, the present invention includes such forms.

A method for producing the optical thin film 1 according to the embodiment shown in FIG. 1A will be described. FIG. 2 is a diagram showing the production step.

The interlayer 3 is formed on the substrate 2 (Step 1), then the anchor metal diffusion control layer 6 is formed, a metal in a metal oxide included in the anchor region and the cap region is formed into a layer as the anchor metal layer 7, and further, the silver-containing metal layer 4 is formed (Step 2). The anchor metal diffusion control layer 6, the anchor metal layer 7, and the silver-containing metal layer 4 are formed in the atmosphere in which oxygen does not exist. The film thickness of the anchor metal layer 7 is preferably about 0.2 nm to 2.0 nm.

Since a part of the anchor metal constituting the anchor metal layer is moved to the surface of the silver-containing metal layer 4 in the production process as already described above, the anchor metal layer is altered into the anchor region and the film thickness is greatly changed. The movement (diffusion) of the anchor metal starts to occur immediately after the silver-containing metal layer 4 is formed.

Thereafter, the substrate 2 on which the interlayer 3, the anchor metal diffusion control layer 6, the anchor metal layer 7, and the silver-containing metal layer 4 are laminated in order is exposed to the atmospheric air and annealing treatment is performed in the atmospheric air (Step 3). The annealing temperature is preferably 100° C. or higher and 400° C. or lower and the annealing time is preferably about 1 minute or longer and 2 hours or shorter. When the annealing treatment is started, some of the anchor metal in the anchor metal layer 7 already passes through the silver-containing metal layer 4 and a precursor region 9a of the cap region is being formed on the surface of the silver-containing metal layer 4. On the other hand, the anchor metal layer 7 becomes a region 8a in the middle of alternation into the anchor region.

In the anchor metal which has started to move after the film formation, the anchor metal moved to the surface of the silver-containing metal layer 4 starts to be oxidized in a stage in which the substrate 2 is exposed to the atmospheric air. Then, the diffusion or oxidation of the anchor metal is promoted by annealing treatment and after the annealing treatment, the anchor metal layer 7 is altered into the anchor region 8 and the anchor metal which has passed through the silver-containing metal layer 4 and moved to the surface of the laminate is oxidized to form a metal oxide. Thus, the cap region 9 including the metal oxide is formed (Step 4). Since the anchor metal diffusion control layer 6 is provided, the diffusion of the anchor metal is suppressed and the anchor metal can remain on the side close to the substrate 2 in the silver-containing metal layer 4 for the anchor region.

Thereafter, the dielectric layer 5 is formed on the cap region 9 which is the outermost surface of the laminate (Step 5).

Through the above steps, the optical thin film 1 of the embodiment shown in FIG. 1A can be prepared.

The optical thin film according to the embodiment of the present invention can be used as a transparent conductive film or an antireflection film. The optical thin film is particularly suitable for an antireflection film and can be applied to the surface of various optical members. Since the optical thin film of the first embodiment described above does not have an uneven structure or a porous structure, the mechanical strength is high, and the optical thin film can be applied to the surface touched by the hand of a user. Since the optical thin film can be applied to a lens surface of high refractive index, for example, the optical thin film is suitable for the outermost surface of a known zoom lens described in JP2011-186417A.

Next, an optical thin film according to a second embodiment of the present invention will be described.

Figure 1B:
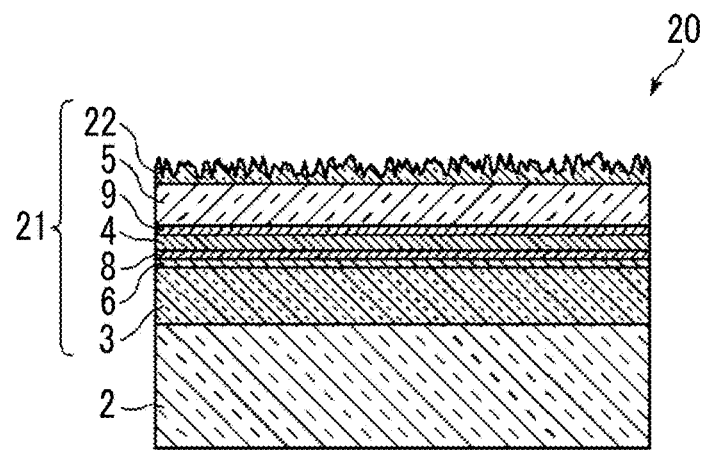
FIG. 1B is a schematic cross-sectional view showing a schematic configuration of an optical element including an optical thin film according to a second embodiment of the present invention.

FIG. 1B is a schematic cross-sectional view showing the schematic configuration of an optical element 20 including an optical thin film 21 according to a second embodiment. As shown in FIG. 1B, the optical thin film 21 of the embodiment is formed by laminating an interlayer 3, a silver-containing metal layer 4, and a dielectric layer 5 on a substrate 2 in this order. In the optical thin film 21, an anchor metal diffusion control layer 6 having a Hamaker constant of $7.3 \times 10^{-20}$ J or more is provided between the interlayer 3 and the silver-containing metal layer 4. Further, in the optical thin film 21, an anchor region 8 including an oxide of an anchor metal is provided between the anchor metal diffusion control layer 6 and the silver-containing metal layer 4, and a cap region 9 including an oxide of an anchor metal is provided between the silver-containing metal layer 4 and the dielectric layer 5. The configuration up to this point is the same as that of the optical thin film 1 of the first embodiment, but the optical thin film 21 of the second embodiment further includes a fine uneven layer 22 having alumina hydrate as the main component on the surface of the dielectric layer 5. In addition, the total film thickness of the silver-containing metal layer 4, the anchor region 8, and the cap region 9 is 2.7 nm or less.

The fine uneven layer 22 has alumina hydrate as the main component. Here, the main component is a component at a content of 80% by mass or more among the constitutional components of the fine uneven layer. Here, the alumina hydrate means boehmite which is alumina monohydrate (expressed as $Al_2O_3 \cdot H_2O$ or AlOOH), bayerite which is alumina trihydrate (expressed as $Al_2O_3 \cdot 3H_2O$ or $Al(OH)_3$), and the like.

The fine uneven layer 22 is transparent and although the size (apex angle size) and the direction of convex portions are various, the fine uneven layer has an approximately sawtooth-shaped cross section. The distance between the convex portions of the fine uneven layer 22 refers to a distance between the apexes of the most adjacent convex portions separated by a concave portion. The distance is equal to or less than the wavelength of light of which reflection is to be prevented. The distance is preferably of the order of several tens of nm to several hundreds of nm, more preferably 200 nm or less, and even more preferably 150 nm or less.

The fine uneven layer 22 can be obtained by forming a thin film of a compound including aluminum, and immersing the thin film of the compound including aluminum in hot water of 70° C. or higher for 1 minute or longer to perform hot water treatment. In particular, it is preferable to perform hot water treatment after an aluminum film is formed by vapor phase deposition such as vacuum evaporation, plasma sputtering, electron cyclotron sputtering, ion plating, and the like.

According to the configuration of the optical thin film of the embodiment, it is possible to realize an antireflection film with a very low reflectance.

Even in a case where the total film thickness of the silver-containing metal layer 4, the anchor region, and the cap region is more than 2.7 nm, a very low reflectance can be realized by providing the fine uneven layer on the surface. On the other hand, as an antireflection film including a fine uneven layer, for example, in WO2016-031133A, even with a configuration in which only an interlayer and a fine uneven layer are provided on a substrate, a sufficiently low reflectance is realized (refer to Comparative Example 11 described later). The present inventors have investigated a configuration in which a silver-containing metal layer is provided to the antireflective film including the fine uneven layer described in WO 2016-031133A.

According to the investigation of the present inventors, it has been found that simply providing the silver-containing metal layer in the antireflection film including the fine uneven layer described in WO2016-031133A, may not lead to a further decrease in the antireflection ratio. It has been found that in order to realize a remarkable reduction in reflectance, it is necessary to set the total film thickness of the silver-containing metal layer 4, the anchor region 8, and the cap region 9 to 2.7 nm or less (refer to Examples 11 to 15 described later).

Next, an embodiment of an optical system according to the present invention consisting of a group lens including the optical thin film 1 an antireflection film (hereinafter, also referred to as an antireflection film 1) and an optical element provided on the surface of a lens as a substrate will be described.

(A), (B), and (C) of FIG. 3 show configuration examples of a zoom lens which is an embodiment of the optical system according to the embodiment of the present invention. (A) of FIG. 3 corresponds to an optical system arrangement at a wide angle end (shortest focal length state), (B) of FIG. 3 corresponds to an optical system arrangement in a middle area (intermediate focal length state), and (C) of FIG. 3 corresponds to an optical system arrangement at a telephoto end (longest focal length state).

The zoom lens includes a first lens group G1, a second lens group G2, a third lens group G3, a fourth lens group G4, and a fifth lens group G5 in order from an object along an optical axis Z1. An optical aperture stop Si is preferably arranged between the second lens group G2 and the third lens group G3 in the vicinity of the third lens group G3 on the side close to the object. Each of the lens groups G1 to G5 includes one or a plurality of lenses Lij. The reference symbol Lij denotes a j-th lens with the reference symbol affixed such that a lens arranged to be closest to the object in an i-th lens group is made into the first side and the reference symbol is gradually increased toward an image forming side.

The zoom lens can be mounted in an information portable terminal as well as imaging devices, for example, a video camera, and a digital camera. On the imaging side of the zoom lens, members are arranged according to the configuration of an imaging portion of a camera in which the lens is to be mounted. For example, an imaging element 100 such as a charge coupled device (CCD) or a complementary metal oxide semiconductor (CMOS) is arranged on an image forming surface (imaging surface) of the zoom lens. Various optical members GC may be arranged between the final lens group (fifth lens group G5) and the imaging element 100 according to the configuration of the camera side in which the lens is mounted.

The zoom lens is configured such that the magnification is changed by chaining the gaps between the individual groups by moving at least the first lens group G1, the third lens group G3, and the fourth lens group G4 along the optical axis Z1. In addition, the fourth lens group G4 may be moved at focusing. It is preferable that the fifth lens group G5 is always fixed in magnification change and at focusing. The aperture stop S1 is moved together with the third lens group G3, for example. More specifically, as the magnification changes from the wide angle end to the middle area and further to the telephoto end, each lens group and the aperture stop Si is moved, for example, from the state of (A) of FIG. 3 to the state of (B) of FIG. 3 and further to the state of (C) of FIG. 3 along the locus indicated the solid line in the drawing.

The antireflection film 1 is provided on the outermost surfaces of the zoom lens of the outer surface (the surface close to the object) of a lens L11 of the first lens group G1 and a lens L51 of the fifth lens group G5 which is the final lens group. That is, there is provided an optical member with an embodiment in which the lens L11 and the lens L51 are used as substrates and the antireflection film 1 is provided on the surfaces thereof. In the zoom lens, the antireflection film 1 may be provided other lens surfaces in the same manner.

Since the antireflection film 1 of the first embodiment has high mechanical strength, the antireflection film can be provided on the outermost surface of the zoom lens which may be touched by a user and thus a zoom lens having very high antireflection performance can be formed.

EXAMPLES

Hereinafter, a structure of the main portions of the present invention will be described using specific examples.

First, it was verified that an anchor metal layer formed in the process of the production method according to the embodiment of the present invention constituted an anchor region and a cap region with the silver-containing metal layer interposed therebetween.

<Method for Preparing Sample 1>

An anchor metal layer formed of Ge was formed on a glass substrate ($SiO_2$ substrate). The film was formed under the following conditions using a sputtering apparatus (CFS-8EP) manufactured by Shibaura Mechatronics Co., Ltd.
—Anchor Metal Layer Formation Conditions—
Direct current (DC) input power=20 W
Ar: 20 sccm, Depo pressure (film formation pressure): 0.45 Pa
Film formation temperature: room temperature
A silver-containing metal layer was formed without exposure to the atmospheric air subsequently after the anchor metal layer was formed. Here, a silver film was formed as the silver-containing metal layer. The film formation conditions are as follows.
—Silver Film Formation Conditions—
DC input power=80 W
Ar: 15 sccm, Depo pressure: 0.27 Pa
Film formation temperature: room temperature In the above description, the thickness of the anchor metal layer was 0.68 nm and the thickness of the silver film was 4 nm (here, film thickness herein is a design film thickness). Thereafter, annealing treatment was performed at 300° C. in the atmospheric air.

The following measurement was performed on Sample 1 obtained as described above, and the laminated structure was examined.

<Ratio Between Metal Region and Metal Oxide Region in Anchor Region>

The evaluation was performed by X-ray photoelectron spectroscopy (XPS). As the measurement device, Quantera SXM manufactured by ULVAC-PHI, Inc. was used.

Figure 4:
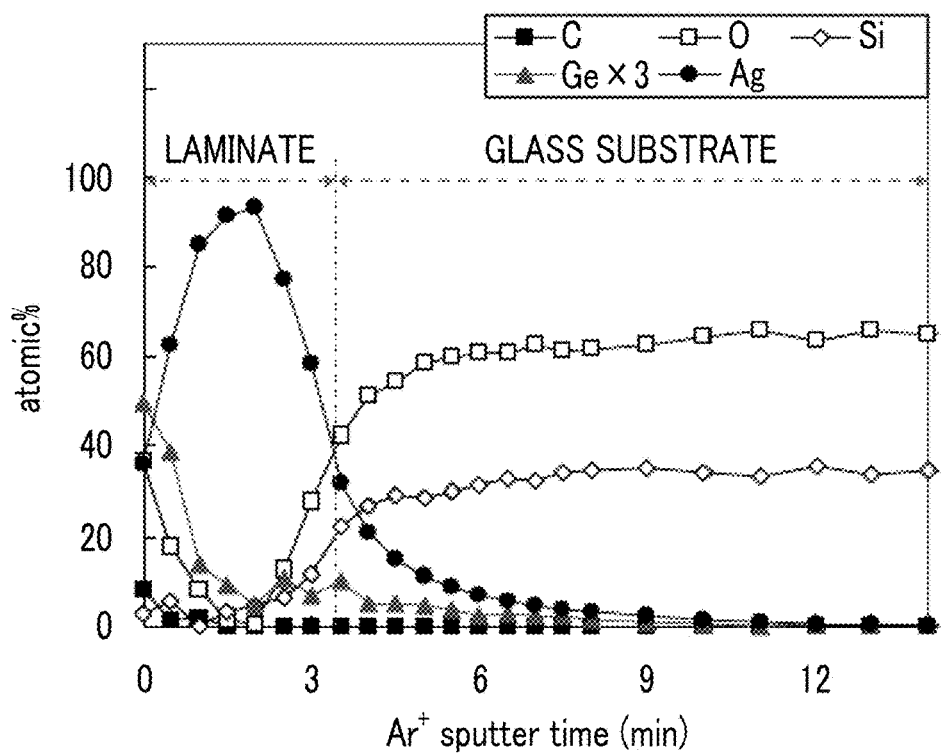
FIG. 4 is a diagram showing an element distribution of Sample 1 in a depth direction before annealing treatment.
Figure 5:
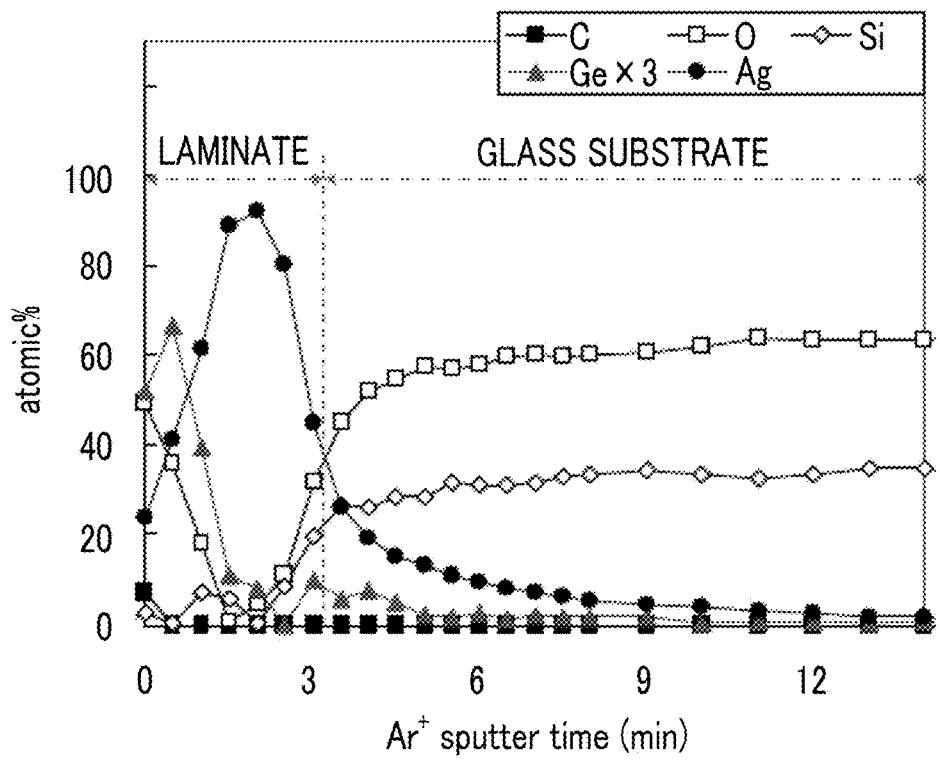
FIG. 5 is a diagram showing an element distribution of Sample 1 in the depth direction after annealing treatment.
Figure 6:
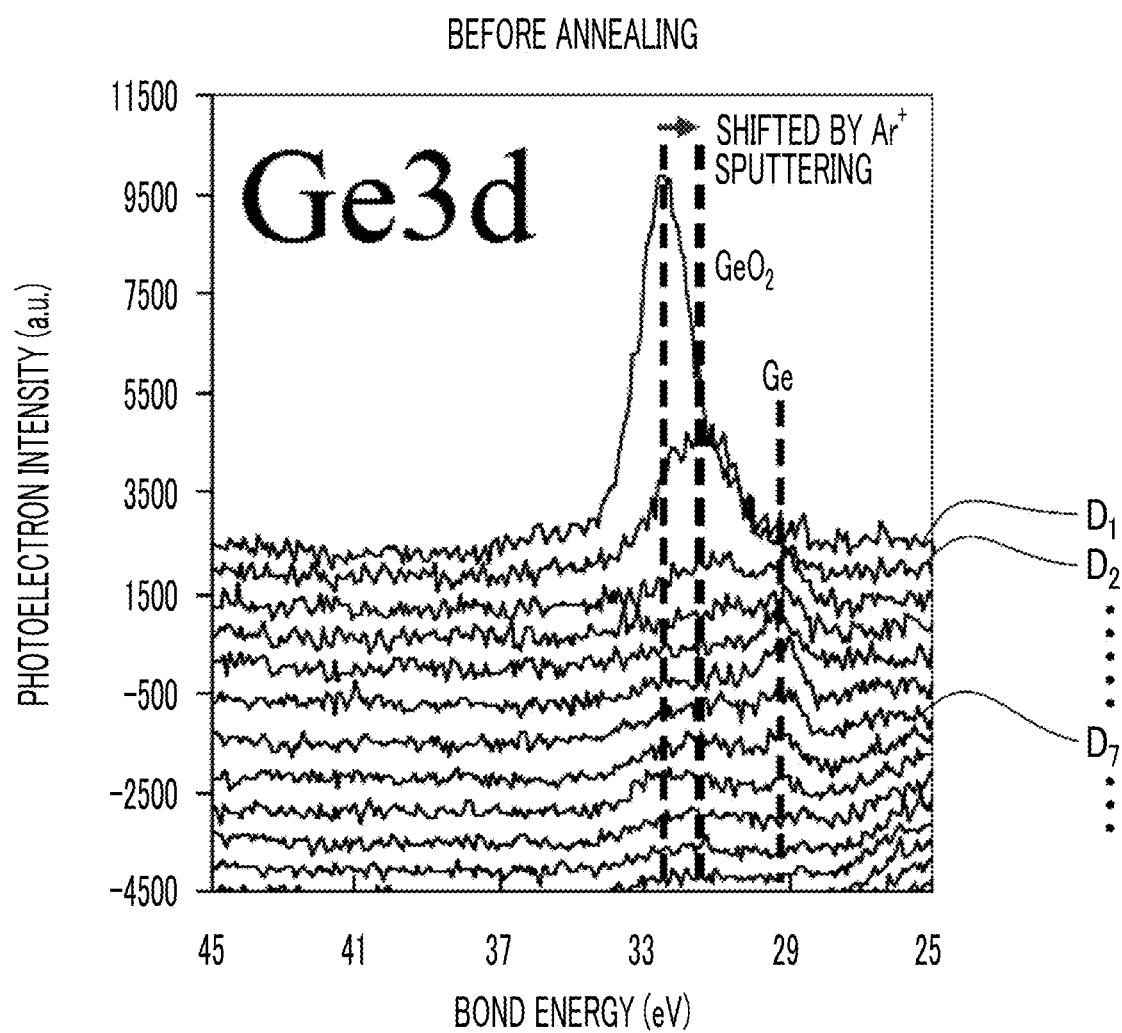
FIG. 6 is a diagram showing a Ge3d spectrum of Sample 1 in the depth direction before annealing treatment.
Figure 7:
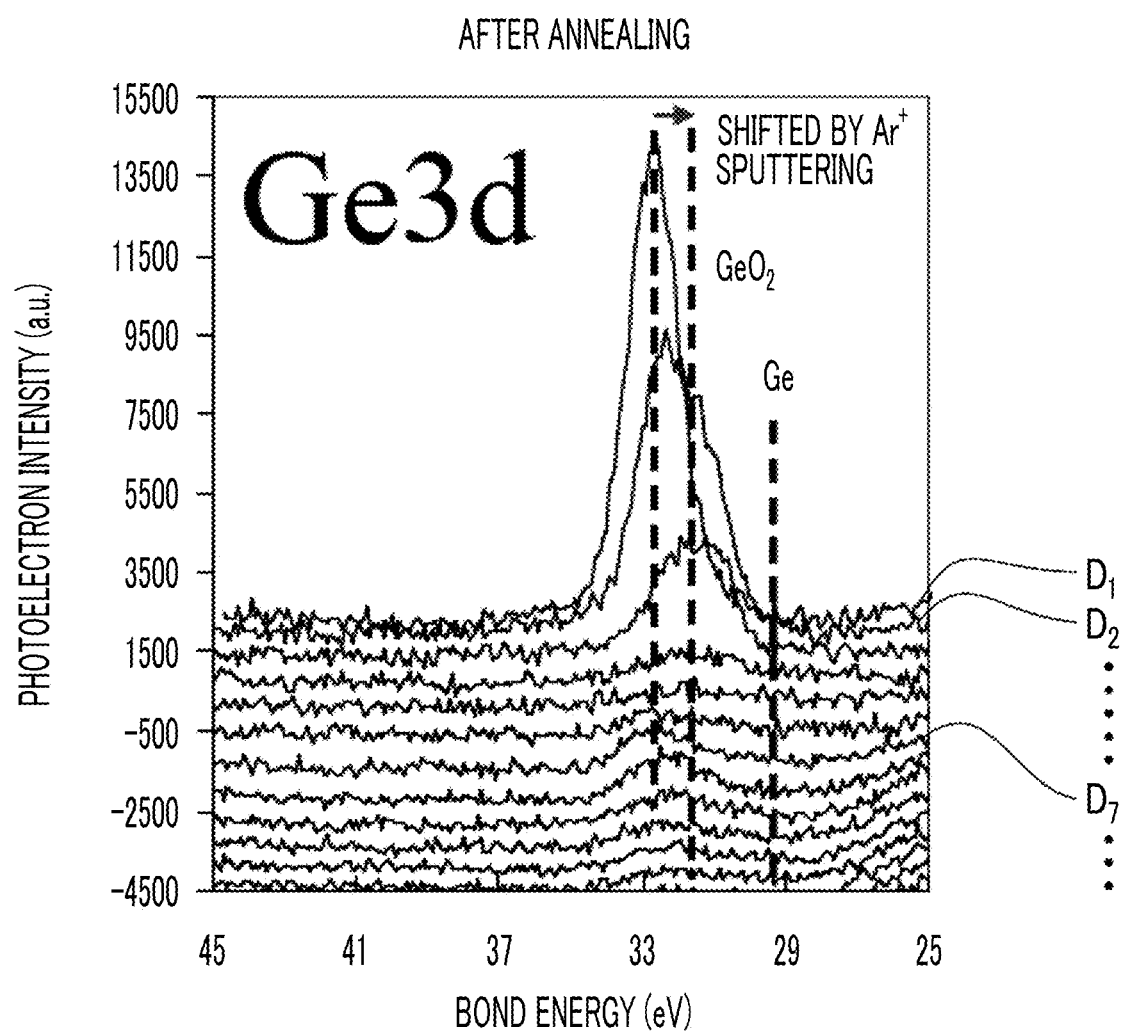
FIG. 7 is a diagram showing a Ge3d spectrum of Sample 1 in the depth direction after annealing treatment.

FIGS. 4 and 5 are graphs showing element distributions of Sample 1 in the depth direction (that is, element distributions in the film thickness direction) from the surface of the laminate to the glass substrate before annealing treatment and after annealing treatment, and the element distributions are obtained by XPS. In FIGS. 4 and 5, the horizontal axis 0 is the position of the surface of the laminate, and in order to make the distribution of Ge easier to see, Ge is shown at a magnification of 3 times. Therefore, the actual content of Ge is ⅓ of the value on the vertical axis of the graph. FIGS. 6 and 7 show Ge3d spectra (Dn:n=1, 2, 3 . . . ) of Sample 1 obtained by XPS and obtained at each position in the depth direction by drilling by $Ar^+$ sputtering in the depth direction from the surface of the laminate to the substrate before annealing treatment and after annealing treatment at the same time. In the drawings, data DI is the data on the laminate surface position, and as n becomes larger, the data indicates the position closer to the substrate drilled by $Ar^+$ sputtering in a direction perpendicular to the surface. In FIGS. 6 and 7, regarding the peak of $GeO_2$ on the surface is slightly shifted to the low bond energy side due to the effect of $Ar^+$ sputtering. The data acquisition interval in the horizontal axis (sputtering time) in FIGS. 4 and 5 the data acquisition interval from the surface to the substrate in FIGS. 6 and 7 correspond to each other.

By comparing FIG. 6 with FIG. 7, it is found that the peak of $GeO_2$ on the surface becomes large after annealing treatment, while the peak of Ge present before annealing treatment is not present after annealing treatment. In addition, in the inside in the depth direction, before annealing treatment, the peak intensity of Ge is higher than the peak intensity of $GeO_2$, but after annealing treatment, inversely, the peak intensity of $GeO_2$ is higher than the peak intensity of Ge. At least from FIG. 7, it is possible to determine that the content of $GeO_2$ is larger than the content of Ge in the anchor region of Sample 1 (after annealing treatment). Specifically, it is considered that the seventh and eighth data from the surface in FIG. 7 corresponds to the anchor region.

<Evaluation of Presence of Oxide Layer in Cap Region>

The presence of the oxide of the anchor metal in the cap region measured by XPS and a transmission electron microscope (TEM) was evaluated by energy dispersive X-ray spectroscopy (EDX) (FIGS. 6 and 7).

Figure 8:
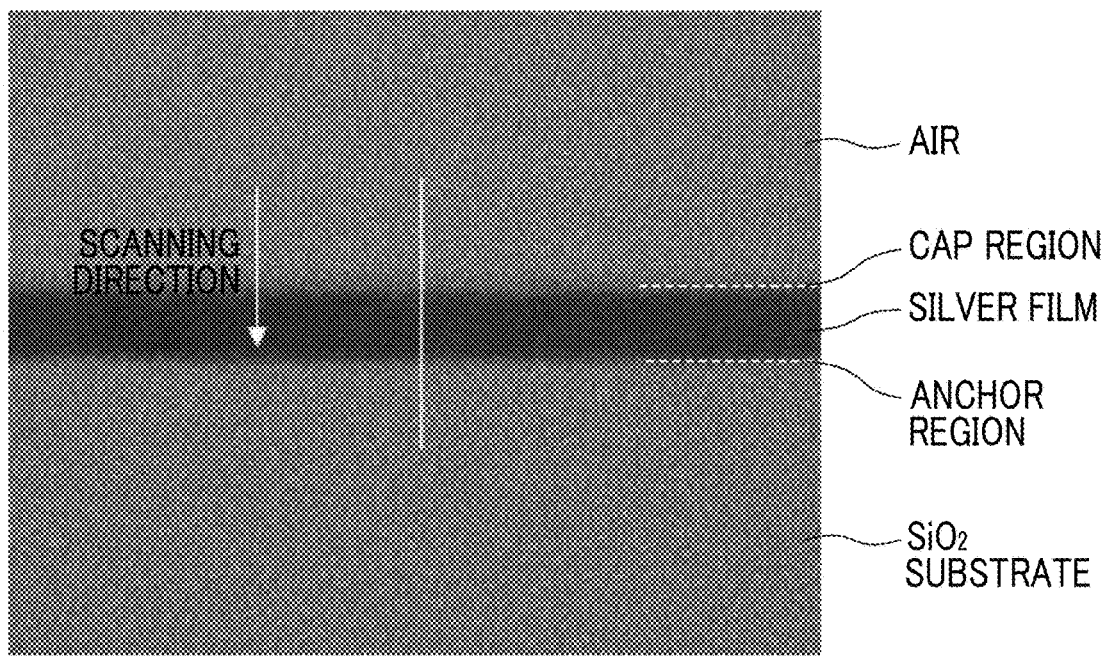
FIG. 8 is a scanning transmission electron microscope image of Sample 1.
Figure 9:
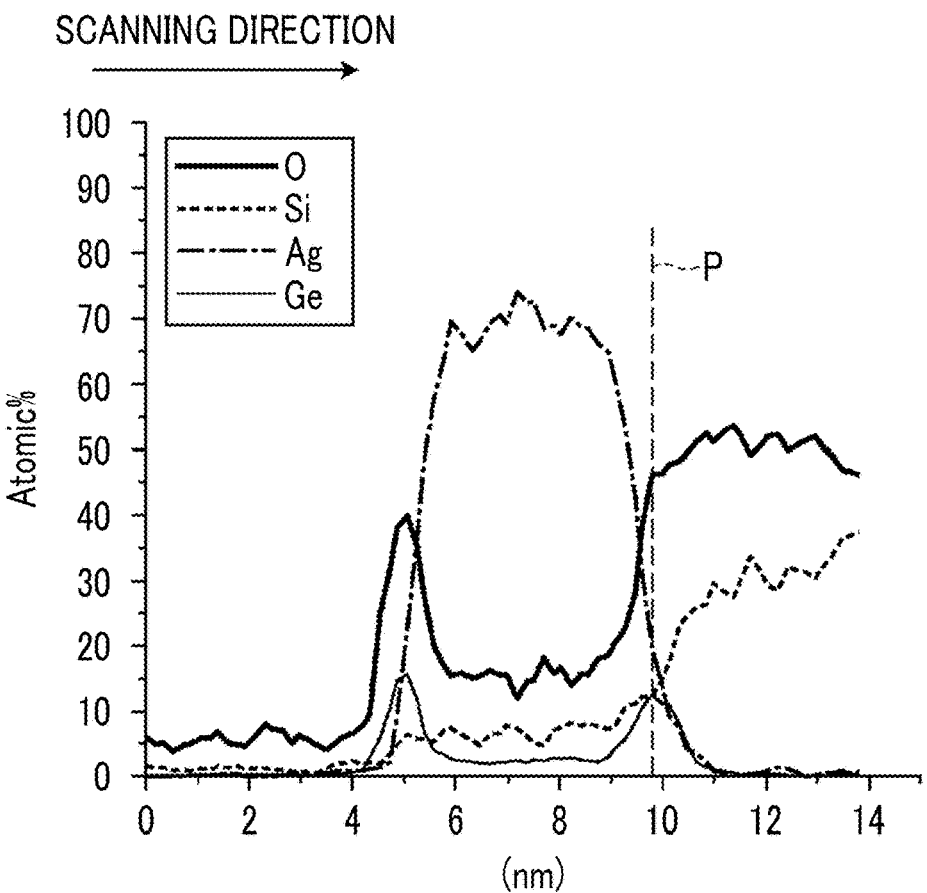
FIG. 9 is a diagram showing an element distribution of Sample 1 in the depth direction by energy dispersive X-ray spectrometry.

FIG. 8 is a bright-field-scanning transmission electron microscope image (Bright-field-STEM image) of Sample 1, and an EDX analysis portion is the region shown by the white line near the center in FIG. 8. FIG. 9 is a graph showing the distribution of the element to be analyzed in the depth direction according to the EDX analysis result. As a transmission electron microscope, HD-2700 manufactured by Hitachi High-Technologies Corporation was used.

As described above, the presence of $GeO_2$ in the anchor region in Sample 1 was confirmed from FIG. 7. On the other hand, the compositional ratio at each position in the depth direction is clear from the distribution of each element in the depth direction shown in FIG. 9, and from the compositional ratio, it is possible to calculate the existence probability of $GeO_2$ and Ge.

In FIG. 9, the anchor region is near at the position of 9.8 nm (indicated by P in FIG. 9) where the horizontal axis Ge is a peak. Since the anchor region is a region adjacent to the substrate, Si is bled out. At this peak position, the compositional ratio of Ge, Si, and O is Ge (12%), Si (12%), and O (48%) and thus it is found that oxygen is present in the forms of $SiO_2$ and $GeO_2$.

As described above, it was confirmed that by laminating the anchor metal layer and the silver-containing metal layer on the substrate and performing annealing treatment in the atmosphere, a part of Ge constituting the anchor metal layer passed through the silver-containing metal layer, was moved to the surface side of the silver-containing metal layer and oxidized to form a cap region, while at least a part of the anchor region was oxidized.

Next, Examples and Comparative Examples in which an anchor metal diffusion control layer, an anchor region, a silver-containing metal layer, and a cap region are provided on a glass substrate (however, the interlayer and the dielectric layer were not provided) are prepared and the results of evaluation on transparency thereof and the smoothness of the silver-containing metal layer will be described.

<Preparation Method of Examples and Comparative Examples>

First, an anchor metal diffusion control layer formed of a material shown in Table 2 was formed on a glass substrate. A film was formed under the following conditions using a sputtering apparatus (CFS-8EP) manufactured by Shibaura Mechatronics Corporation. The following anchor metal layer and silver-containing metal layer were also formed using the same sputtering apparatus.

—Film Formation Conditions of Anchor Metal Diffusion Control Layer—

RF (alternating current) input power=400 W

Ar: 40 sccm, $O_2$: 2.5 sccm, Depo pressure (film formation pressure): 0.21 Pa

Film formation temperature: room temperature

After the anchor metal diffusion control layer was formed, an anchor metal layer formed of Ge was sequentially formed without being exposed to the atmosphere.

—Film Formation Conditions of Anchor Metal Layer—

Direct current (DC) input power=20 W

Ar: 20 sccm, Depo pressure (film formation pressure): 0.45 Pa

Film formation temperature: room temperature

Further, after the anchor metal was formed, a silver layer was sequentially formed without being exposed to the atmosphere.

—Film Formation Conditions of Silver Layer—

DC input power=80 W

Ar: 15 sccm, Depo pressure: 0.27 Pa

Film formation temperature: room temperature

In the film formation of each layer, the film thickness of the anchor metal diffusion control layer was set to 20 nm, the film thickness of the anchor metal layer was set to 0.68 nm, and the film thickness of the silver film as the silver-containing metal layer was set to 2 nm. Here, the film thickness refers to a design film thickness.

Thereafter, annealing treatment was performed under the conditions of 300° C. and 5 minutes in the atmosphere for each of Examples and Comparative Examples.

The uniformity and permeability of the films of Examples and Comparative Examples obtained as described above were evaluated.

<Evaluation of Uniformity and Permeability>

—Evaluation of Absorbance of Visible Light—

Figure 10:
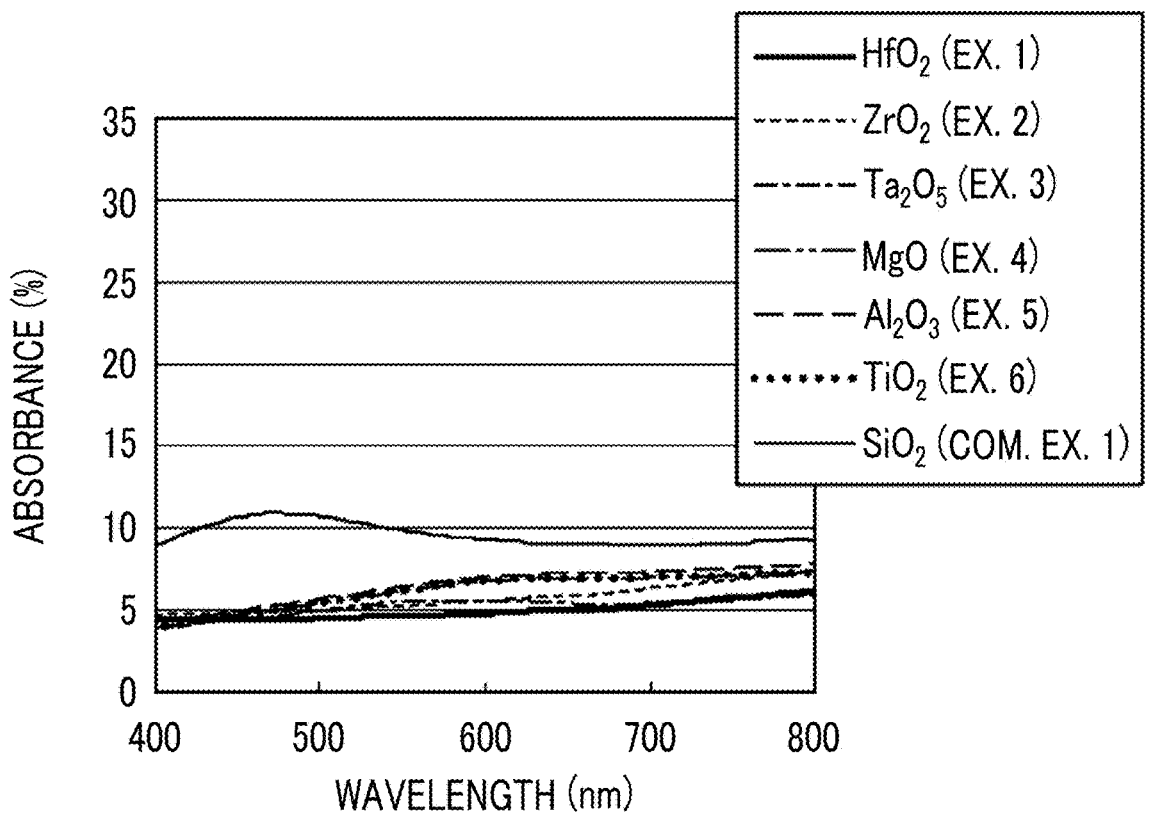
FIG. 10 is a diagram showing the wavelength dependence of the absorbance of optical thin films in Examples and Comparative Example.

The absorbance of light at a wavelength of 400 nm to 800 nm, which is the visible region, was measured by a spectrophotometer. Specifically, using a spectrophotometer (HITACHI U-4000), the absorbance was measured at a scan speed of 600 nm/min in the wavelength range of 400 nm to 800 nm. In a case where plasmon absorption in the visible region occurs, the absorbance increases. In a case where the absorbance is approximately 10% or less, there is no problem in practical use. FIG. 10 shows the measurement results of each example and is a graph showing the wavelength dependency of absorbance. In a wavelength range of 400 nm to 800 nm, those exhibiting an absorbance of more than 10% were evaluated such that plasmon absorption "occurred", and those having an absorbance of 10% or less were evaluated such that plasmon absorption did "not occurred". The results are shown in Table 2.

In addition, in a case where silver is granulated, the plasmon absorption in the visible region occurs. Thus, an increase in the absorbance of visible light means that the granulated portion is increased. That is, the lower the absorbance, the less silver granulation and the higher the flatness of the film. In addition, an increase in the absorbance of visible light leads to a decrease in the transmittance of visible light. Thus, in the evaluation of the absorbance, in a case where plasmon absorption does "not occur", it is considered that the transparency is good.

—Electrical Resistivity Evaluation of Silver-Containing Metal Layer—

The electrical resistivity (Q cm) of each of Examples and Comparative Examples was measured by a four-terminal method using LORESTA GP, manufactured by Mitsubishi Chemical Corporation, and an ESP probe. The measurement results are shown in Table 2.

Since the electrical resistivity of the silver-containing metal layer is increased due to a partial increase in resistance in a discontinuous part in the silver-containing metal layer or in a part where the film thickness changes, the electrical resistivity is an indicator showing the uniformity of the film. The electrical resistivity becomes smaller as the film uniformity (in particular, the flatness) becomes higher, and becomes larger as the uniformity becomes lower.

<Measurement of Hamaker Constant>

The Hamaker constant of the anchor metal diffusion control layer was obtained based on the van Oss theory as already described above.

The material constituting the anchor metal diffusion control layer used in each example was used to form a film with a film thickness of 20 nm on a separate glass substrate. Regarding the films formed using each material, the contact angles of three liquids of water, diiodomethane, and ethylene glycol were respectively measured by a liquid droplet dropping method using Dropmaster manufactured by Kyowa Interface Science Co., Ltd. and the Lifshitz vdW term ($\gamma^{LW}$) in the surface energy of the thin film was obtained. Then, the Hamaker constant $A_{11}$ was calculated based on the relational expression $A_{11}=24\pi D_0^2\gamma^{LW}$. Here, $D_0=0.165$ nm was adopted.

Table 2 collectively shows the film configurations and measurement (evaluation) results of Examples 1 to 6 and Comparative Example 1 prepared by the above methods and evaluated.

TABLE 2

| | Film thickness of silver film | Anchor metal (film thickness) | Anchor metal diffusion control layer | | Hamaker constant ($\times 10^{-20}$ J) | Plasmon absorption | Resistivity ($\Omega$ cm) |
|---|---|---|---|---|---|---|---|
| | | | Constitutional material | Film thickness | | | |
| Example 1 | 2 nm | Ge (0.68 nm) | $HfO_2$ | 20 nm | 11.2 | Not occurred | $1.20 \times 10^{-5}$ |
| Example 2 | 2 nm | Ge (0.68 nm) | $ZrO_2$ | 20 nm | 11.8 | Not occurred | $1.40 \times 10^{-5}$ |
| Example 3 | 2 nm | Ge (0.68 nm) | $Ta_2O_5$ | 20 nm | 9.5 | Not occurred | $1.77 \times 10^{-5}$ |
| Example 4 | 2 nm | Ge (0.68 nm) | MgO | 20 nm | 7.3 | Not occurred | $2.40 \times 10^{-5}$ |
| Example 5 | 2 nm | Ge (0.68 nm) | $Al_2O_3$ | 20 nm | 9.6 | Not occurred | $1.81 \times 10^{-5}$ |
| Example 6 | 2 nm | Ge (0.68 nm) | $TiO_2$ | 20 nm | 10 | Not occurred | $1.70 \times 10^{-5}$ |
| Comparative Example 1 | 2 nm | Ge (0.68 nm) | $SiO_2$ | 20 nm | 5.6 | occurred | $4.50 \times 10^{-5}$ |

Figure 11:
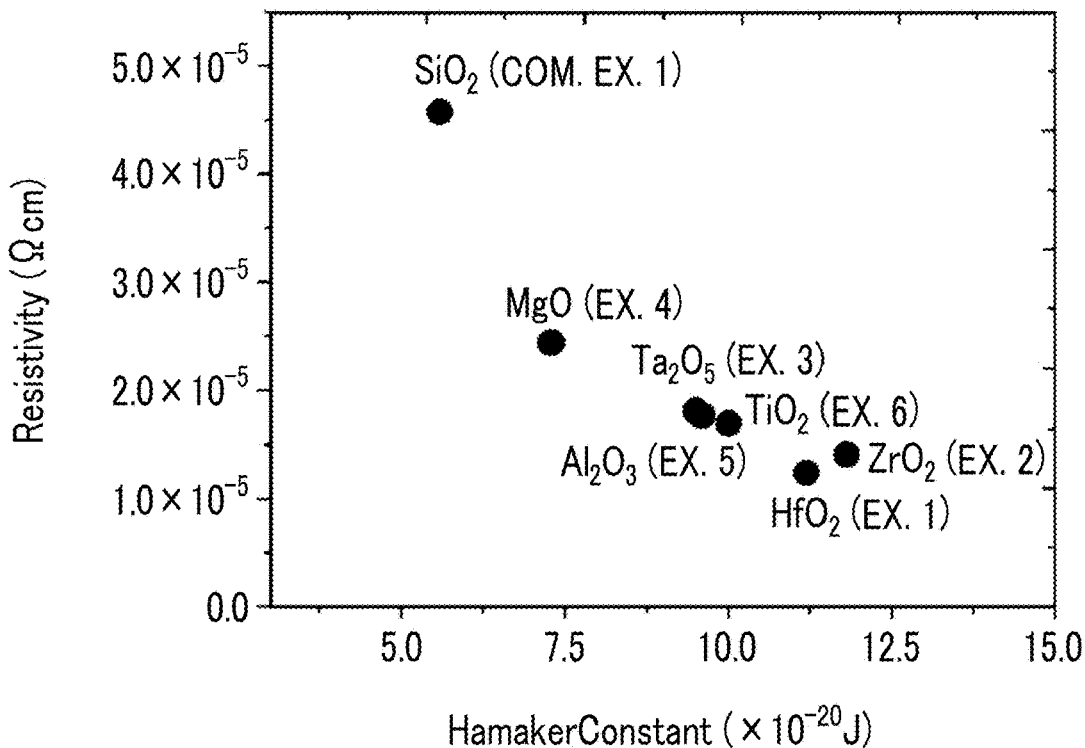
FIG. 11 is a diagram showing a relationship of the Hamaker constant of an anchor metal diffusion control layer, and the electrical resistivity of a silver film in the optical thin films in Examples and Comparative Example.

As shown in Table 2, regarding Examples 1 to 6 in which the Hamaker constant of the anchor metal diffusion control layer was $7.3 \times 10^{-20}$ J or more, the result that the plasmon absorption of visible light was suppressed compared to Comparative Example 1, and the electrical resistivity was low were obtained (refer to FIG. 11). That is, it is considered that Examples 1 to 6 has a silver-containing metal layer having high flatness.

<Effect of Anchor Metal Diffusion Control Layer Including $HfO_2$>

Further, the result of the verification of the effect of the anchor metal diffusion control layer including Hf will be described. The distribution of the amount of Ge in the depth direction was measured for the laminates of Example 1 using $HfO_2$ for the anchor metal diffusion control layer and Comparative Example 1 using $SiO_2$ for the anchor metal diffusion control layer obtained as described above. The evaluation was performed by XPS using Quantera SXM manufactured by ULVAC-PHI Inc.

Figure 12:
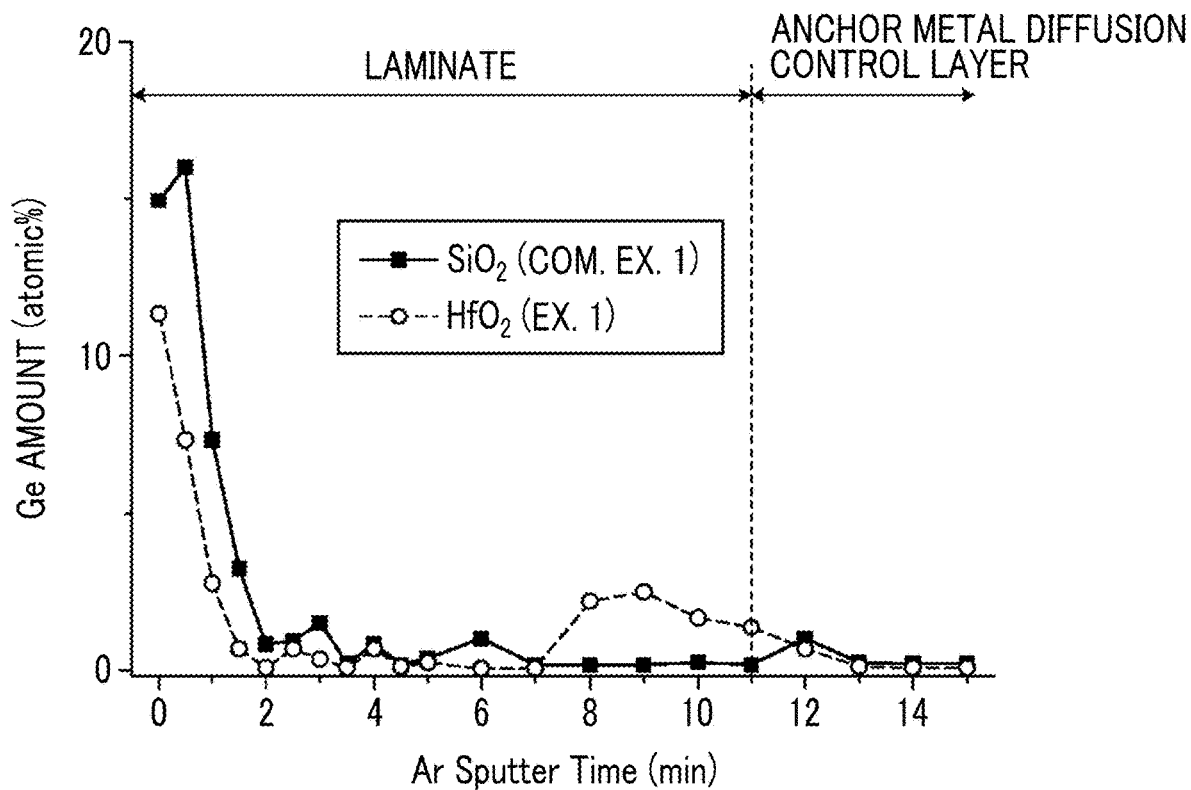
FIG. 12 is a diagram showing the analysis results of the optical thin films of Example 1 and Comparative Example 1 by X-ray photoelectron spectroscopy.

Hereinafter, the portion closer to the silver-containing metal layer than to the anchor metal diffusion control layer provided on the glass substrate is referred to as a silver-containing laminate. FIG. 12 is a graph showing the Ge element distribution in the depth direction from the surface side in the lamination direction to the anchor metal diffusion control layer in the optical thin films of Example 1 and Comparative Example 1 obtained by XPS. The excavation was performed by $Ar^+$ sputtering and elemental analysis in the depth direction was performed. In the drawing, the horizontal axis 0 is the surface position of the laminate.

As shown in FIG. 12, it is found that in a case where $HfO_2$ is used for the anchor metal diffusion control layer, a region in which the amount of Ge, which is an anchor metal, increases is provided at the interface region between the silver-containing laminate and the anchor metal diffusion control layer, and thus an anchor region is formed. On the other hand, it is found that in a case where $SiO_2$ is used for the anchor metal diffusion control layer, the amount of Ge is decreased at the interface between the silver-containing laminate and the anchor metal diffusion control layer and most of Ge of the anchor metal layer formed on the anchor metal diffusion control layer is moved to the surface side of the laminate.

From the result, it was confirmed that $HfO_2$ having a high Hamaker constant could effectively suppress the diffusion of Ge. It is presumed that since the diffusion of Ge is suppressed, the function as an anchor region to suppress the granulation of the silver-containing metal layer by the anchor metal is maintained, and the flattening of the silver-containing metal layer can be realized.

As the antireflection film which is one embodiment of the optical thin film according to the present invention, a specific layer configuration of Example 7 contributing to the antireflection performance will be described.

In Table 3 below, the layer configuration, the film thickness obtained by optimizing the film thickness using Essential Macleod (manufactured by Thin Film Center, hereinafter, referred to as simulation software), the refractive index, and the extinction coefficient of each layer of the example used in the simulation are shown. All the refractive indices in Table 3 are shown as refractive indices at a wavelength of 550 nm.

In the simulation, it was assumed that FDS 90 (manufactured by HOYA, refractive index: 1.385429) was used as a substrate, and for interlayers 1 to 3, a $SiO_2$ layer (refractive index: 1.4724) as a layer of low refractive index and a layer of Substance-H4 (manufactured by Merck Japan Co., Ltd., refractive index: 2.04288) as a layer of high refractive index were alternately laminated. A configuration in which a $HfO_2$ layer (refractive index: 2.06111) was formed for an anchor metal diffusion control layer, Ge, which is an anchor metal, and a silver film, which is a silver-containing metal layer, were formed on the anchor metal diffusion control layer, and further, an $MgF_2$ layer (refractive index: 1.38996) was formed thereon as a dielectric layer was provided. In the layer configuration, the film thickness was optimized such that the average value of reflectance in the visible light region (a wavelength of 400 nm to 800 nm) was minimized. In the simulation, the anchor metal layer and the silver film are handled integrally as a silver-containing metal layer. The same applies to the following examples.

Figure 13:
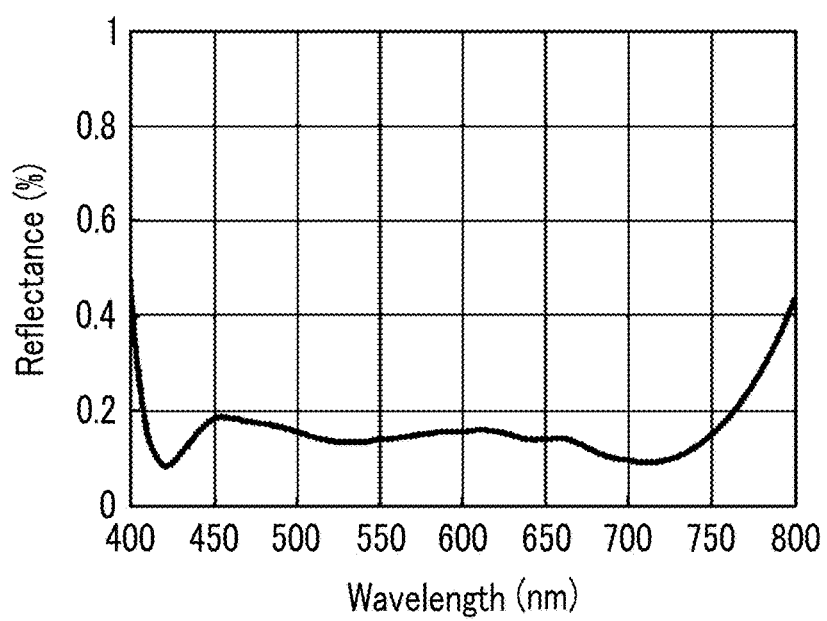
FIG. 13 is a diagram showing the wavelength dependency of the reflectance obtained by simulation of an antireflection film of Example 7.

FIG. 13 shows the wavelength dependency of the reflectance at a wavelength of 400 nm to 800 nm obtained by simulation for the antireflection film of the above configuration.

From the obtained simulation result, it was confirmed that the antireflection film of this example had a reflectance of 0.2% or less in a range of 450 to 750 nm, and exhibited excellent antireflection performance.

TABLE 3

| Layer configuration | Material | Refractive index | Extinction coefficient | Film thickness [nm] |
|---|---|---|---|---|
| Medium | Air | 1 | 0 | — |
| Dielectric layer | $MgF_2$ | 1.38996 | 0 | 85.45 |
| Silver-containing metal layer | Ag/Ge | 0.14086 | 3.90017 | 3.3 |
| Anchor metal diffusion control layer | $HfO_2$ | 2.06111 | 0.00215 | 32.8 |

TABLE 3-continued

| Layer configuration | Material | Refractive index | Extinction coefficient | Film thickness [nm] |
|---|---|---|---|---|
| Interlayer 1 | SiO$_2$ | 1.4724 | 0 | 69 |
| Interlayer 2 | Substance-H4 | 2.04289 | 0 | 25.9 |
| Interlayer 3 | SiO$_2$ | 1.4724 | 0 | 27.78 |
| Substrate | FDS90 | 1.85429 | 0 | — |

In the specification of WO2016/189848A, it is reported by the present applicant that the antireflection properties are largely different depending on the formation accuracy of the silver-containing metal layer in a case where the antireflection film is actually produced. According to the specification of WO2016/189848A, as the flatness (uniformity) of the silver-containing metal layer increases, the deviation from the simulation value for the antireflection properties is reduced and the antireflection performance closer to the design specification can be obtained.

That is, as in the examples of the present invention described above, by producing an antireflective film using an optical thin film provided with a silver-containing metal layer having high flatness, it is possible to obtain antireflection properties along with the design value.

Next, Example and Comparative Example for exhibiting the effect of an antireflection film including a fine uneven layer on the surface in the optical thin films of the present invention will be described.

Example 11

Table 4 below shows the layer configuration of the antireflection film, the film thickness obtained by optimizing the film thickness using simulation software, and the refractive index and the extinction coefficient of each layer of Example 11 used for the simulation.

The antireflection film of Example 11 was produced as follows.

A glass material Ohara S-LAH53 was used as a substrate. All the refractive indices in Table 4 are shown as refractive indices at a wavelength of 540 nm. 7 layers of Nb$_2$O$_5$ and SiON were sequentially and alternately formed on the lens curved surface of the substrate by a radical assisted sputtering (RAS) apparatus to form an interlayer. Finally, the formed Nb$_2$O$_5$ layer with a thickness of 9.79 nm functions as an anchor metal diffusion control layer. Further, an anchor metal layer formed of Ge was formed at a thickness of 0.68 nm, and a silver film was formed at a thickness of 1.6 nm in a laminated manner. The film thickness of the silver-containing metal layer described in Table 4 is the total thickness of the anchor metal layer and the silver film. Then, annealing was performed in the atmosphere at 300° C. for 5 minutes. Thereafter, an MgF$_2$ layer was formed at a thickness of 30.64 nm and an Al layer was formed at a thickness of 16 nm by vacuum evaporation. The film thickness of each layer is shown in Table 4. The Hamaker constant of Nb$_2$O$_5$ is $12 \times 10^{-20}$ J. The silver-containing metal layer having good optical properties was obtained by the configuration.

After forming the uppermost layer of Al, the film was immersed in boiling water for 5 minutes to perform hot water treatment. After the hot water treatment, the uppermost layer of Al became a boehmite layer having an uneven boehmite layer (fine uneven layer) on the surface.

In addition, the refractive index of the fine uneven layer in the antireflection film produced as described above was measured with a spectroscopy ellipsometer. The refractive index of the boehmite layer was changed to 1 to 1.29 from the surface side toward the silver-containing metal layer side.

Figure 14:
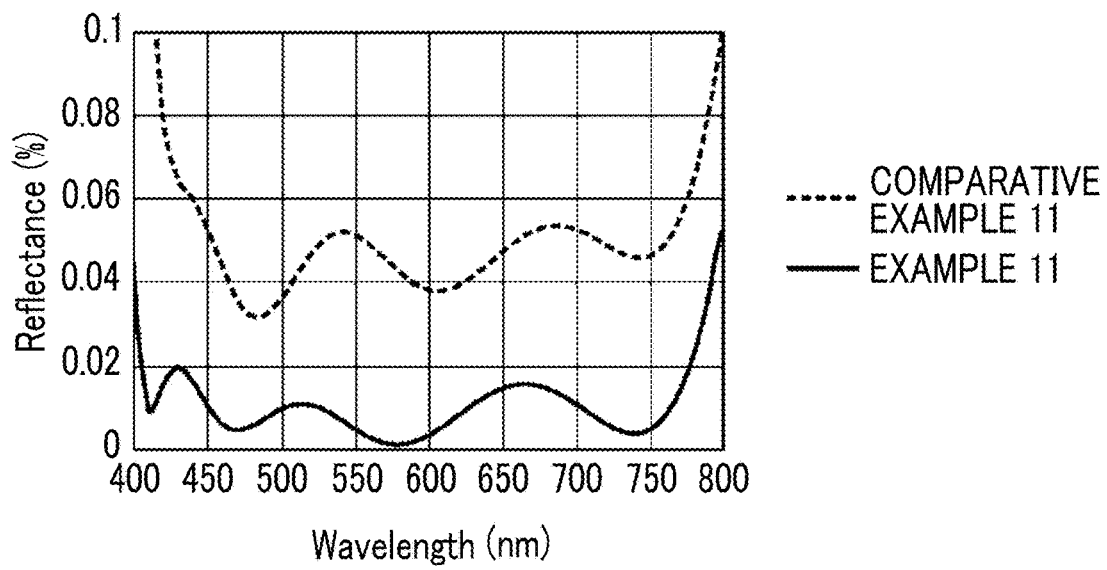
FIG. 14 is a diagram showing the wavelength dependency of the reflectance of antireflection films of Example 11 and Comparative Example 11.

FIG. 14 shows the wavelength dependency of the reflectance at a wavelength of 400 nm to 800 nm obtained by simulation for the antireflection film of the above configuration. In the simulation, the data obtained by measuring the refractive index with the above-mentioned spectroscopic ellipsometer was used as the refractive index of the fine uneven layer. Also in the following examples, the data of the refractive index of the fine uneven layer is common.

Each of the following Examples and Comparative Example has the layer configuration shown in the table. The table shows the film thickness obtained by optimizing the film thickness using simulation software, and the refractive index and the extinction coefficient of each layer used in the simulation.

TABLE 4

| Example 11: Layer configuration | | Material | Refractive index (@540 nm) | Extinction coefficient | Film thickness [nm] |
|---|---|---|---|---|---|
| Fine uneven layer | | Al$_2$O$_3$ (H$_2$O) | 1 to 1.29 | — | — |
| Dielectric layer | | MgF$_2$ | 1.38464 | 0 | 30.64 |
| Silver-containing metal layer | | Ag/Ge | 0.16369 | 3.40235 | 2.28 |
| Interlayer | 1 (Anchor metal diffusion control layer) | Nb$_2$O$_5$ | 2.3672 | 0 | 9.79 |
| | 2 | SiON | 1.5181 | 0.00275 | 89.39 |
| | 3 | Nb$_2$O$_5$ | 2.3672 | 0 | 10.31 |
| | 4 | SiON | 1.5181 | 0.00275 | 60.17 |
| | 5 | Nb$_2$O$_5$ | 2.3672 | 0 | 19.49 |
| | 6 | SiON | 1.5181 | 0.00275 | 39.16 |
| | 7 | Nb$_2$O$_5$ | 2.3672 | 0 | 10.47 |
| Substrate | | S-LAH53 | 1.8117 | 0 | — |

Comparative Example 11

The layer configuration of Comparative Example 11 is shown in Table 5.

TABLE 5

| Comparative Example 11: Layer configuration | | Material | Refractive index (@540 nm) | Extinction coefficient | Film thickness [nm] |
|---|---|---|---|---|---|
| Fine uneven layer | | $Al_2O_3$ ($H_2O$) | 1 to 1.29 | — | — |
| Interlayer | 1 | SiON | 1.5181 | 0.00275 | 50.51 |
| | 2 | $Nb_2O_5$ | 2.3672 | 0 | 15.96 |
| | 3 | SiON | 1.5181 | 0.00275 | 19.93 |
| | 4 | $Nb_2O_5$ | 2.3672 | 0 | 110.93 |
| | 5 | SiON | 1.5181 | 0.00275 | 12.6 |
| | 6 | $Nb_2O_5$ | 2.3672 | 0 | 28.24 |
| | 7 | SiON | 1.5181 | 0.00275 | 25.58 |
| | 8 | $Nb_2O_5$ | 2.3672 | 0 | 12.07 |
| Substrate | | S-LAH53 | 1.8117 | 0 | — |

As shown in Table 5, Comparative Example 11 was configured such that in Example 11, the number of layers of the interlayer was set to 8 and the silver-containing metal layer was not provided. All the refractive indices in Table 5 are shown as refractive indices at a wavelength of 540 nm.

FIG. 14 shows the wavelength dependency of the reflectance at a wavelength of 400 nm to 800 nm obtained by simulation for the antireflection film of the above configuration together with Example 11.

As shown in FIG. 14, in the optical member of Example 11, a very low reflectance of about 0.02% at maximum was realized over a wavelength of 400 to 800 nm. On the other hand, the optical member of Comparative Example 11 had a reflectance of about 0.06% at maximum over a wavelength of 400 to 800 nm.

From the comparison of Example 11 and Comparative Example 11, it was found that by introducing a thin silver-containing metal layer in the antireflection film including the fine uneven layer, a low reflectance which cannot be realized so far as the antireflective film could be obtained.

Example 12

The layer configuration of Example 12 is shown in Table 6.

In the example, a glass material Ohara S-LAH55V was used as a substrate. All the refractive indices in Table 6 are shown as refractive indices at a wavelength of 540 nm. 7 layers of $Si_3N_4$ (referred to as SiN in Table 6, hereinafter, referred to as SiN) and $SiO_2$ (1) were alternately laminated to form an interlayer. SiN on the side of the interlayer closest to the silver-containing metal layer has a function as an anchor metal diffusion control layer. The Hamaker constant of SiN is $9.5 \times 10^{-20}$ J. $SiO_2$ (1) was taken as the refractive index of the film in a case where film formation was performed by electron cyclotron resonance (ECR) sputtering.

The film thickness of the silver-containing metal layer in Table 6 is the total film thickness of 0.68 nm of the anchor metal layer and the film thickness of the silver film, and 3 configurations in which the total film thicknesses respectively were set to 2.1 nm, 2.7 nm, and 3.3 nm were investigated (in the first row of the table, each example is described as Ag 2.1 nm, Ag 2.7 nm, and Ag 3.3 nm for the sake of simplicity; the same applies to the following examples). Here, a case where the film thickness of the silver-containing metal layer is set to 2.1 nm and 2.7 nm corresponds to Examples of the present invention. An example in which the film thickness of the silver-containing metal layer is more than 2.7 nm is a reference example.

Figure 15:
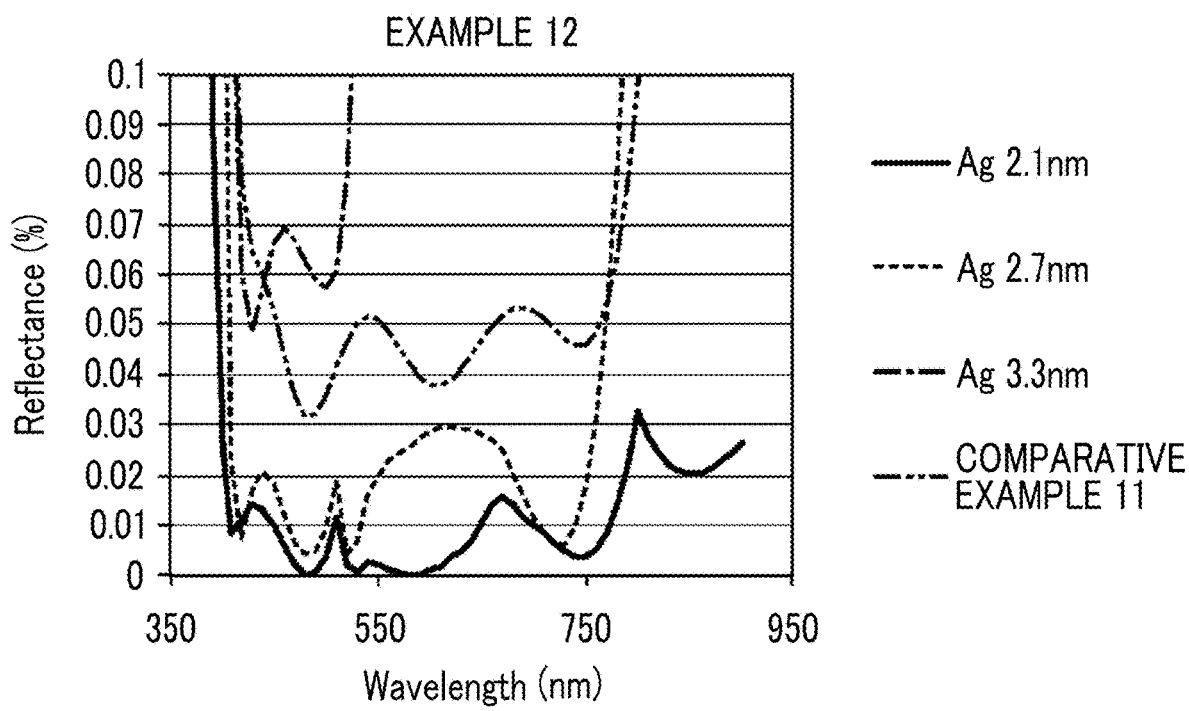
FIG. 15 is a diagram showing the wavelength dependency of the reflectance of an antireflection film of Example 12.

FIG. 15 shows the wavelength dependency of the reflectance obtained by simulation for the antireflection film of Example 12 of the above configuration. FIG. 15 also shows the wavelength dependency of the reflectance of Example 12 together with the result of Comparative Example 11 for comparison. As shown in FIG. 15, in a case where the silver-containing metal layer is 3.3 nm (reference example),

TABLE 6

| Example 12: Layer configuration | | Material | Refractive index (@540 nm) | Ag 2.1 nm Film thickness [nm] | Ag 2.7 nm Film thickness [nm] | Ag 3.3 nm Film thickness [nm] |
|---|---|---|---|---|---|---|
| Fine uneven layer | | $Al_2O_3$ ($H_2O$) | 1 to 1.29 | — | — | — |
| Dielectric layer | | $MgF_2$ | 1.38464 | 31.15 | 26.27 | 25.53 |
| Silver-containing metal layer | | Ag/Ge | 0.2951 | 2.11 | 2.7 | 3.3 |
| Interlayer | 1 (Anchor metal diffusion control layer) | SiN | 1.9869 | 17.76 | 14.9 | 18.11 |
| | 2 | $SiO_2$ (1) | 1.44803 | 84.39 | 110.79 | 104.33 |
| | 3 | SiN | 1.97765 | 17.01 | 18.01 | 17.94 |
| | 4 | $SiO_2$ (1) | 1.44803 | 50.93 | 33.36 | 34.78 |
| | 5 | SiN | 1.9765 | 36.63 | 160.31 | 151.39 |
| | 6 | $SiO_2$ (1) | 1.44803 | 21.33 | 10.7 | 9.79 |
| | 7 | SiN | 1.9765 | 24.81 | 25.77 | 22.67 |
| Substrate | | S-LAH55V | 1.84037 | — | — | — | the reflectance is higher than that of Comparative Example 11 and the performance is lowered. On the other hand, in a case where the silver-containing metal layer is 2.7 nm or less, a very good low reflectance can be obtained.

Example 13

The layer configuration of Example 13 is shown in Table 7.

TABLE 7

| Example 13: Layer configuration | Material | Refractive index (@540 nm) | Ag 2.1 nm Film thickness [nm] | Ag 2.7 nm Film thickness [nm] | Ag 3.3 nm Film thickness [nm] |
|---|---|---|---|---|---|
| Fine uneven layer | $Al_2O_3$ ($H_2O$) | 1 to 1.29 | — | — | — |
| Dielectric layer | $MgF_2$ | 1.38464 | 21.25 | 24.58 | 23.42 |
| Silver-containing metal layer | Ag/Ge | 0.2951 | 2.3 | 2.7 | 3.3 |
| Anchor metal diffusion control layer | $Al_2O_3$ | 1.62744 | 5.00 | 5.00 | 5.00 |
| Interlayer 1 | $HfO_2$ | 2.06162 | 5.9 | 11.34 | 12.9 |
| 2 | $SiO_2$ (1) | 1.44803 | 124.38 | 103.09 | 107.21 |
| 3 | $HfO_2$ | 2.06162 | 18.22 | 18.2 | 19.71 |
| 4 | $SiO_2$ (1) | 1.44803 | 29.42 | 33.05 | 29.8 |
| 5 | $HfO_2$ | 2.06162 | 146.76 | 143.98 | 99.52 |
| 6 | $SiO_2$ (1) | 1.44803 | 11.82 | 11.59 | 6.47 |
| 7 | $HfO_2$ | 2.06162 | 22.24 | 20.55 | 26.56 |
| Substrate | S-LAH55V | 1.84037 | — | — | — |

In the example, a glass material Ohara S-LAH55V was used as a substrate. All the refractive indices in Table 7 are shown as refractive indices at a wavelength of 540 nm. 7 layers of $HfO_2$ and $SiO_2$ were alternately laminated to provide an interlayer. In addition, a configuration in which an $Al_2O_3$ layer having a film thickness of 5.0 nm is provided on the interlayer as an anchor metal diffusion control layer is provided.

The film thickness of the silver-containing metal layer in Table 7 is the total film thickness of 0.68 nm of the anchor metal layer and the film thickness of the silver film, and 3 configurations in which the total film thicknesses respectively were set to 2.3 nm, 2.7 nm, and 3.3 nm were investigated. A case where the film thickness of the silver-containing metal layer is set to 2.3 nm and 2.7 nm corresponds to Examples of the present invention. An example in which the film thickness of the silver-containing metal layer is 3.3 nm is a reference example.

Figure 16:
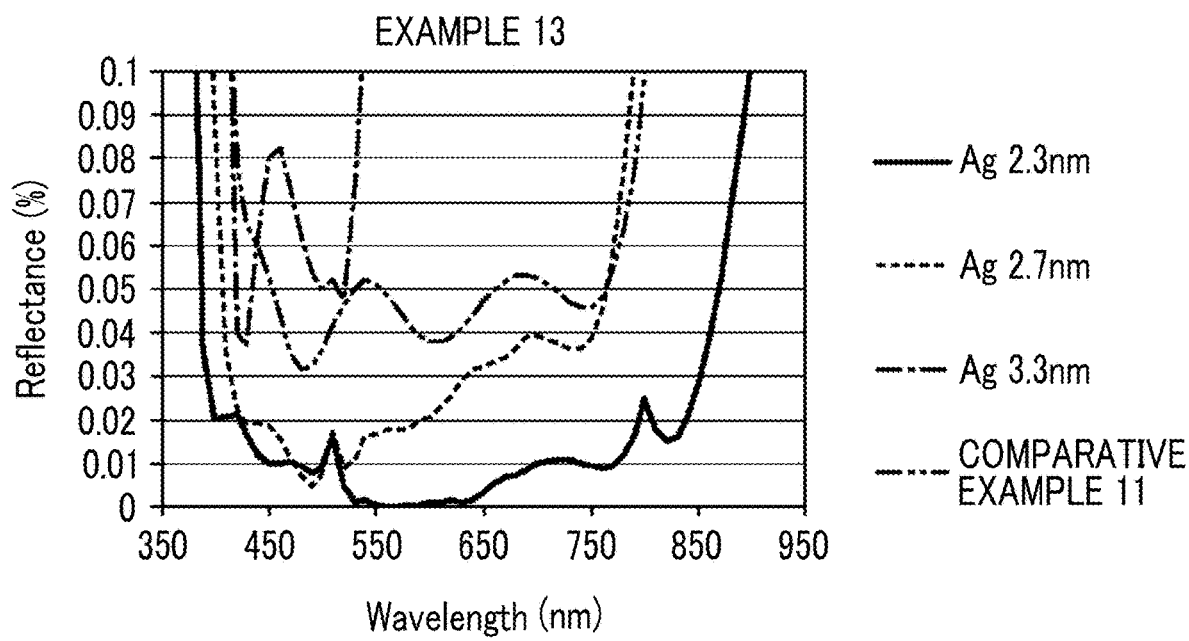
FIG. 16 is a diagram showing the wavelength dependency of the reflectance of an antireflection film of Example 13.

FIG. 16 shows the wavelength dependency of the reflectance obtained by simulation for the antireflection film of Example 13 of the above configuration. FIG. 16 also shows the wavelength dependency of the reflectance of Example 13 together with the result of Comparative Example 11 for comparison. As shown in FIG. 16, in a case where the thickness of the silver-containing metal layer is 3.3 nm (reference example), the reflectance is higher than that of Comparative Example 11 and the performance is lowered.

On the other hand, in a case where the thickness of the silver-containing metal layer is 2.7 nm or less, a very good low reflectance can be obtained.

Example 14

The layer configuration of Example 14 is shown in Table 8.

TABLE 8

| Example 14: Layer configuration | Material | Refractive index (@540 nm) | Ag 2.1 nm Film thickness [nm] | Ag 2.7 nm Film thickness [nm] | Ag 3.3 nm Film thickness [nm] |
|---|---|---|---|---|---|
| Fine uneven layer | $Al_2O_3$ ($H_2O$) | 1 to 1.29 | — | — | — |
| Dielectric layer | $MgF_2$ | 1.38464 | 22.81 | 26.49 | 24.88 |
| Silver-containing metal layer | Ag/Ge | 0.2951 | 2.3 | 2.7 | 3.3 |
| Interlayer 1 (anchor metal diffusion control layer) | $HfO_2$ | 2.06162 | 7.36 | 13.18 | 15.59 |
| 2 | $SiO_2$ (1) | 1.44803 | 135.57 | 109.2 | 105.29 |
| 3 | $HfO_2$ | 2.06162 | 18.24 | 17.12 | 17.02 |
| 4 | $SiO_2$ (1) | 1.44803 | 28.95 | 33.52 | 33.35 |
| 5 | $HfO_2$ | 2.06162 | 148.37 | 145.59 | 131.68 |
| 6 | $SiO_2$ (1) | 1.44803 | 11.8 | 12.15 | 9.53 |
| 7 | $HfO_2$ | 2.06162 | 22.24 | 20.19 | 18.69 |
| Substrate | S-LAH55V | 1.84037 | — | — | — |

Example 14 is configured such that in the configuration of Example 13, $Al_2O_3$ was not used for the anchor metal diffusion control layer, and the anchor metal layer was directly provided on the interlayer. In Example 14, the $HfO_2$ layer arranged on the side of the interlayer closest to the silver-containing metal layer also functions as the anchor metal diffusion control layer. All the refractive indices in Table 8 are shown as refractive indices at a wavelength of 540 nm.

Figure 17:
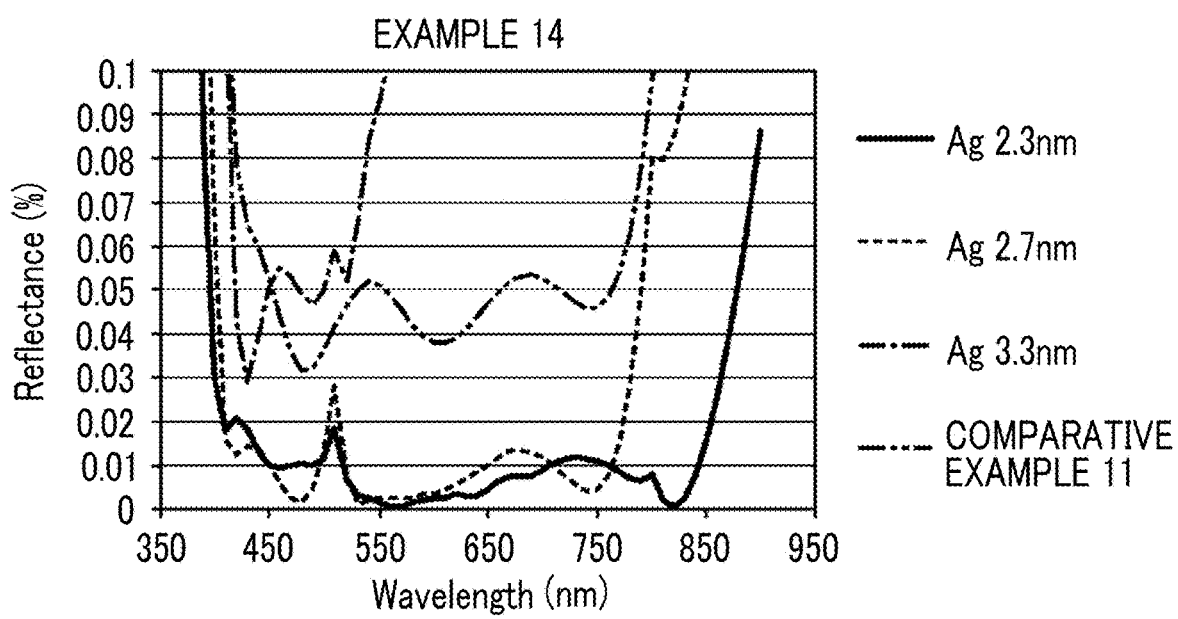
FIG. 17 is a diagram showing the wavelength dependency of the reflectance of an antireflection film of Example 14.

FIG. 17 shows the wavelength dependency of the reflectance obtained by simulation for the antireflection film of Example 14 of the above configuration. FIG. 17 also shows the wavelength dependency of the reflectance of Example 14 together with the result of Comparative Example 11 for comparison. As shown in FIG. 17, in a case where the thickness of the silver-containing metal layer is 3.3 nm (reference example), the reflectance is higher than that of Comparative Example 11, and the performance is lowered. On the other hand, in a case where the thickness of the silver-containing metal layer is 2.7 nm or less, a very good low reflectance can be obtained. In addition, in Example 14, a low reflectance is obtained over a wider range than in Example 13.

Example 15

The layer configuration of Example 15 is shown in Table 9.

TABLE 9

| Example 15: Layer configuration | | Material | Refractive index (@540 nm) | Extinction coefficient | Film thickness [nm] |
|---|---|---|---|---|---|
| Dielectric layer | | MgF$_2$ | 1.38996 | 0 | 85.54 |
| Silver-containing metal layer | | Ag/Ge | 0.25238 | 3.84704 | 3.3 |
| Anchor metal diffusion control layer | | Al$_2$O$_3$ (H$_2$O) | 1.62695 | 0 | 5 |
| Interlayer | 1 | Substance-H4 | 2.04289 | 0 | 20.83 |
| | 2 | SiO$_2$ (2) | 1.4724 | 0 | 91.73 |
| | 3 | Substance-H4 | 2.04289 | 0 | 14.69 |
| | 4 | SiO$_2$ (2) | 1.4724 | 0 | 34.74 |
| Substrate | | FDS90 | 1.85429 | 0 | — |

In the example, a glass material OHARA FDS 90 was used as a substrate. All the refractive indices in Table 9 are shown as refractive indices at a wavelength of 550 nm. 4 layers of SiO$_2$ (2) and Substance H4 (manufactured by Merck) were alternately laminated to form an interlayer. A configuration in which an Al$_2$O$_3$ layer is formed at a thickness of 5.0 nm on the interlayer as an anchor metal diffusion control layer is provided. The refractive index of SiO$_2$ (2) in the example was a refractive index of a film in the case of film formation by an electron beam (EB) evaporation method.

The film thickness of the silver-containing metal layer described in Table 9 is the total film thicknesses of 0.68 nm of the anchor metal layer and the film thickness of the silver film, and the total film thickness was set to 3.3 nm. The example has the configuration of the optical thin film according to the first embodiment described above except that the fine uneven layer is not provided.

Figure 18:
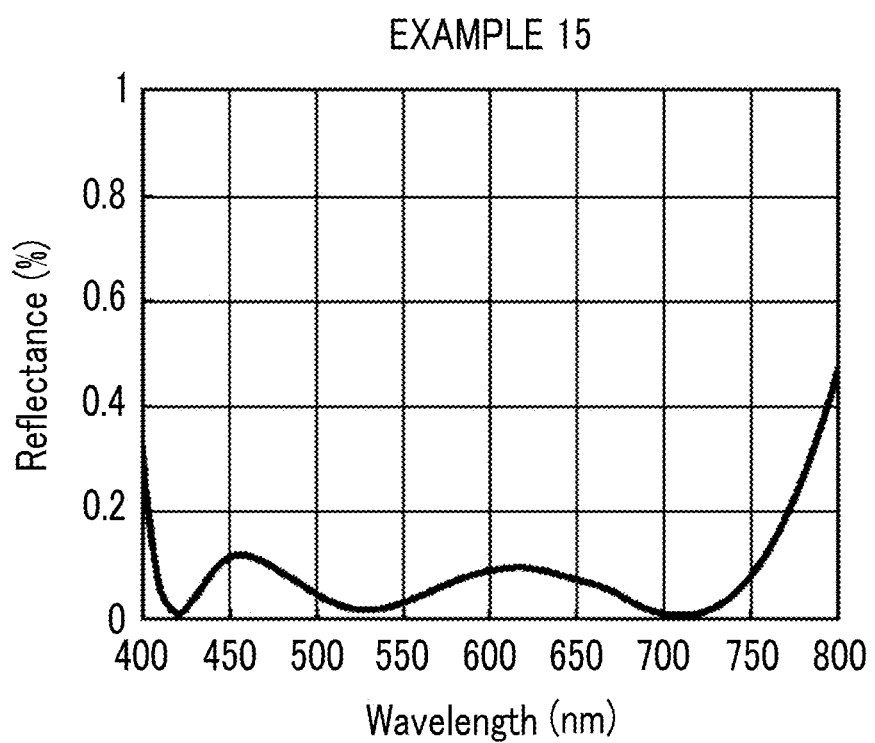
FIG. 18 is a diagram showing the wavelength dependency of the reflectance of an antireflection film of Example 15.

FIG. 18 shows the wavelength dependency of the reflectance obtained by the simulation for the antireflection film of Example 15.

As shown in FIG. 18, in the antireflection film of the embodiment, a reflectance of 0.5% or less at most was obtained over a wavelength of 400 to 800 nm.

It is apparent that in the configuration in which the fine uneven layer of boehmite is provided on the surface as in Examples 11 to 14, a very low reflectance can be obtained as compared with the configuration in which the fine uneven layer is not provided as in Example 15. On the other hand, as described above, the abrasion resistance of the lens or the like on the outermost surface side (the endmost surface) of the group lens is significantly high compared to a case where the fine uneven layer is not provided as in Example 15. Therefore, in a case where the optical thin film according to the embodiment of the present invention is used as an antireflective film, a configuration having a fine uneven layer or a configuration not having a fine uneven layer may be appropriately used depending on the application.

EXPLANATION OF REFERENCES 1, 21: optical thin film (antireflection film)
2: substrate
3: interlayer
4: silver-containing metal layer
5: dielectric layer
6: anchor metal diffusion control layer
7: anchor metal layer
8: anchor region
8a: region in the middle of alternation into anchor region
9: cap region
9a: precursor region of cap region
10, 20: optical element
11: layer of high refractive index
12: layer of low refractive index
22: fine uneven layer
100: imaging element
G1 to G5: lens group
GC: optical member
L11 to L51: lens
S1: aperture stop
Z1: optical axis

What is claimed is:

1. An optical thin film that is formed by laminating, from a substrate side, an interlayer, a silver-containing metal layer containing silver, and a dielectric layer in this order,
wherein an anchor metal diffusion control layer that has a Hamaker constant of $7.3 \times 10^{-20}$ J or more is provided between the interlayer and the silver-containing metal layer,
an anchor region which includes an oxide of an anchor metal and has a surface energy that is less than a surface energy of the silver-containing metal layer and larger than a surface energy of the anchor metal diffusion control layer is provided between the anchor metal diffusion control layer and the silver-containing metal layer,
a cap region which includes an oxide of the anchor metal is provided between the silver-containing metal layer and the dielectric layer,
a fine uneven layer having alumina hydrate as a main component is provided on a surface of the dielectric layer, and
a total film thickness of the silver-containing metal layer, the anchor region, and the cap region is 2.7 nm or less.
2. The optical thin film according to claim 1,
wherein the anchor metal diffusion control layer includes a metal oxide, a metal nitride, a metal oxynitride or a metal carbide.
3. The optical thin film according to claim 1,
wherein the anchor metal diffusion control layer contains a Hf oxide.

4. The optical thin film according to claim 1,
wherein the anchor region includes a non-oxidized anchor metal, and a content ratio of the oxide of the anchor metal is larger than a content ratio of the non-oxidized anchor metal.

5. The optical thin film according to claim 1,
wherein the anchor metal is Ge, Sn, In, Ga, or Zn.

6. An optical element comprising:
an antireflection film formed of the optical thin film according to claim 1.

7. An optical system comprising:
a group lens in which a surface on which the antireflection film of the optical element according to claim 6 is provided is arranged as an outermost surface.

* * * * *